US008649580B2

(12) United States Patent
Yamamoto

(10) Patent No.: US 8,649,580 B2
(45) Date of Patent: Feb. 11, 2014

(54) IMAGE PROCESSING METHOD, IMAGE PROCESSING APPARATUS, AND COMPUTER-READABLE RECORDING MEDIUM STORING IMAGE PROCESSING PROGRAM

(75) Inventor: Yoko Yamamoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 563 days.

(21) Appl. No.: 12/873,674

(22) Filed: Sep. 1, 2010

(65) Prior Publication Data

US 2011/0057946 A1    Mar. 10, 2011

(30) Foreign Application Priority Data

Sep. 1, 2009   (JP) .................................. 2009-202027

(51) Int. Cl.
*G06K 9/00* (2006.01)
(52) U.S. Cl.
USPC .......................................................... 382/128
(58) Field of Classification Search
None
See application file for complete search history.

(56) References Cited

U.S. PATENT DOCUMENTS

2007/0047804 A1*   3/2007   Arai ............................... 382/162

FOREIGN PATENT DOCUMENTS

| JP | 2001-523334 A | 11/2001 |
|----|---------------|---------|
| JP | 2005-524072 A | 8/2005 |
| JP | 2005-331394 | 12/2005 |
| JP | 2008-215820 A | 9/2008 |
| WO | 98/43042 A1 | 10/1998 |
| WO | 03/091729 A1 | 11/2003 |

OTHER PUBLICATIONS

"Color Correction of Pathological Images Based on Dye Amount Quantification", Optical Review (2005), vol. 12, No. 4, pp. 293-300.
"Development of Support Systems for Pathology using Spectral Transmittance—The quantification Method of Stain Conditions", Proceedings of SPIE, Image Processing (2002), vol. 4684, pp. 1516-1523.
Notice of Rejection dated Jul. 9, 2013 from related Japanese Application No. 2009-202027, together with an English language translation.
Notice of Rejection dated Oct. 22, 2013 from corresponding Japanese Patent Application No. 2009-202027, together with an English language translation.

* cited by examiner

*Primary Examiner* — Claire X Wang
(74) *Attorney, Agent, or Firm* — Scully, Scott, Murphy & Presser, P.C.

(57) ABSTRACT

An image processing method includes obtaining a first spectral characteristic value in a sample point on a stained sample based on a value of a pixel of a stained-sample image obtained by imaging the stained sample, the sample point corresponding to the pixel, the stained sample being stained with a predetermined staining dye and to be observed; and obtaining gradual second spectral characteristic values on the staining dye. The method also includes estimating an amount of the staining dye in the sample point on the staining sample by using the second dye spectral characteristic values on the staining dye based on the first spectral characteristic value.

19 Claims, 16 Drawing Sheets

—— : DYE H0
—·—·— : DYE H1
—————— : DYE H2

—— : DYE H0
———— : DYE H1
————— : DYE H2

IMAGE PROCESSING METHOD, IMAGE PROCESSING APPARATUS, AND COMPUTER-READABLE RECORDING MEDIUM STORING IMAGE PROCESSING PROGRAM

CROSS-REFERENCE TO RELATED APPLICATION

This application is based upon and claims the benefit of priority from Japanese Patent Application No. 2009-202027, filed on Sep. 1, 2009, the entire contents of which are incorporated herein by reference.

BACKGROUND OF THE INVENTION

1. Field of the Invention

The present invention relates to an image processing method, an image processing apparatus, and a computer-readable recording medium that records an image processing program for processing a stained-sample image obtained by imaging a sample which is stained with a predetermined staining dye.

2. Description of the Related Art

For example, in pathological diagnosis, a method is widely used such that a tissue specimen obtained by removal of an organ or needle biopsy is thinly sliced to obtain a sample having a thickness of a few microns, and magnification observation is made with a microscope in order to acquire various findings. Particularly, transmission observation using an optical microscope is one of the most popular observation methods for reasons such that devices are relatively inexpensive and easy to handle, and the method has long history. In this case, a specimen removed from a living body hardly absorbs and scatters light and is nearly clear and colorless. Consequently, at the time of creation of a sample, the specimen is generally stained with a dye.

Various staining methods are proposed and the total number thereof rises to 100 or larger. Particularly, for a pathological sample, hematoxylin-eosin staining (hereinbelow, called "H&E staining") is normally employed. The H&E staining uses blue-purple hematoxylin (referred to as "dye H" below) and red eosin (referred to as "dye E" below) as staining dyes. In a sample subjected to the H&E staining (stained sample), a cell nucleus, a bone tissue, and the like are stained in blue-purple, and a cytoplasm, a connective tissue, a red blood cell, and the like are stained in red, so that they can be easily visually recognized. As a result, an observer can grasp sizes, positional relations, and the like of components of the tissue such as the cell nucleus and morphologically determine a state of the sample.

A stained sample is observed visually or a stained sample which is imaged and displayed on a display device is observed. An attempt to process and analyze a stained-sample image and support observation and diagnosis of a doctor and the like is proposed. As an example, there is a conventionally known method of quantitatively estimating the amount of a staining dye with which a point on a stained sample (sample point) is stained on the basis of a stained-sample image obtained by performing multiband imaging on the stained sample, and the method is applied to various purposes. For example, a method for estimating a dye amount and correcting color information of a stained-sample image on the basis of the estimated dye amount is disclosed in "Color Correction of Pathological Images Based on Dye Amount Quantification", OPTICAL REVIEW Vol. 12, No. 4 (2005), pp. 293-300. A method of quantitatively evaluating a stained state of a sample on the basis of an estimated dye amount is disclosed in "Development of Support Systems for Pathology using Spectral Transmittance—The quantification Method of Stain Conditions", Proceedings of SPIE, Image Processing, Vol. 4684 (2002), pp. 1516-1523. Japanese Laid-open Patent Publication No. 2005-331394 discloses a method of classifying tissues in a sample on the basis of an estimated dye amount and dividing an image into regions on a tissue unit basis.

A method of quantitatively estimating a dye amount from a stained-sample image (multiband image) will be described using a sample subjected to the H&E staining as an example. Prior to estimation of a dye amount, for example, the background without a sample is imaged in a state where illumination light is irradiated to capture a multiband image of the background (illumination light). First, the multiband image of the background is set as $I_0$, a multiband image of a stained sample to be observed is set as I, and spectral transmittance $t(x,\lambda)$ in each pixel position is calculated by the following Equation (1). Here, x denotes a position vector expressing a pixel in the multiband image, and $\lambda$ denotes wavelength. $I(x,\lambda)$ expresses a pixel value in a pixel position (x) at the wavelength $\lambda$ of a multiband image I, and $I_0(x,\lambda)$ expresses a pixel value in a pixel position (x) at the wavelength $\lambda$ of the multiband image $I_0$.

$$t(x, \lambda) = \frac{I(x, \lambda)}{I_0(x, \lambda)} \tag{1}$$

Regarding the spectral transmittance $t(x,\lambda)$, the Lambert-Beer law is satisfied. For example, in the case where a sample is stained with two staining dyes of the dyes H and E, the following Equation (2) is satisfied at each wavelength $\lambda$ by the Lambert-Beer low.

$$-\log t(x,\lambda) = k_H(\lambda)d_H(x) + k_E(\lambda)d_E(x) \tag{2}$$

In Equation (2), $k_H(\lambda)$ and $k_E(\lambda)$ are coefficients unique to a substance and determined depending on the wavelength $\lambda$. For example, $k_H(\lambda)$ indicates a coefficient corresponding to the dye H, and $k_E(\lambda)$ represents a coefficient corresponding to the dye E. For example, the values of $k_H(\lambda)$ and $k_E(\lambda)$ are dye spectral characteristic values of the dyes H and E with which a sample is stained (hereinbelow, the dye spectral characteristic value of a dye with which a sample is stained will be called "reference spectrum"). $d_H(x)$ and $d_E(x)$ correspond to amounts of the dyes H and E at each of the sample points in the stained sample corresponding to the pixel positions (x) in a multiband image. More specifically, when the amount of the dye H in a sample stained only with the dye H is set as "1", $d_H(x)$ is obtained as a value relative to the dye amount. Similarly, when the amount of the dye E in a sample stained only with the dye E is "1", $d_E(x)$ is obtained as a value relative to the dye amount. The dye amount is also called density.

Equation (2) is satisfied independently every wavelength $\lambda$. Equation (2) is a linear equation of $d_H(x)$, $d_E(x)$, and a method of solving it is generally known as multiple linear regression analysis. For example, by using simultaneous Equations (2) for two or more different wavelengths, they can be solved.

For example, when the equations are simultaneously used for M (M≥2) wavelengths $\lambda_1, \lambda_2, \ldots, \mu_M$, they can be expressed as the following Equation (3). $[\,]^t$ shows a transposed matrix, and $[\,]^{-t}$ expresses an inverse matrix.

$$\begin{bmatrix} -\log t(x, \lambda_1) \\ -\log t(x, \lambda_2) \\ \vdots \\ \log t(x, \lambda_M) \end{bmatrix} = \begin{bmatrix} k_H(\lambda_1) & k_E(\lambda_1) \\ k_H(\lambda_2) & k_E(\lambda_2) \\ \vdots & \vdots \\ k_H(\lambda_M) & k_E(\lambda_M) \end{bmatrix} \begin{bmatrix} d_H(x) \\ d_E(x) \end{bmatrix} \quad (3)$$

When Equation (3) is solved by using least-squares estimation, the following Equation (4) is obtained. An estimation value $\hat{d}_H(x)$ of the amount of the dye H and an estimation value $\hat{d}_E(x)$ of the amount of the dye E are obtained.

$$\begin{bmatrix} \hat{d}_H(x) \\ \hat{d}_E(x) \end{bmatrix} = \left( \begin{bmatrix} k_H(\lambda_1) & k_E(\lambda_1) \\ k_H(\lambda_2) & k_E(\lambda_2) \\ \vdots & \vdots \\ k_H(\lambda_M) & k_E(\lambda_M) \end{bmatrix}^t \begin{bmatrix} k_H(\lambda_1) & k_E(\lambda_1) \\ k_H(\lambda_2) & k_E(\lambda_2) \\ \vdots & \vdots \\ k_H(\lambda_M) & k_E(\lambda_M) \end{bmatrix} \right)^{-1} \begin{bmatrix} k_H(\lambda_1) & k_E(\lambda_1) \\ k_H(\lambda_2) & k_E(\lambda_2) \\ \vdots & \vdots \\ k_H(\lambda_M) & k_E(\lambda_M) \end{bmatrix}^t \begin{bmatrix} -\log t(x, \lambda_1) \\ -\log t(x, \lambda_2) \\ \vdots \\ \log t(x, \lambda_M) \end{bmatrix} \quad (4)$$

By Equation (4), the estimation values of the amounts of the dyes H and E in an arbitrary sample point on a stained sample are obtained.

SUMMARY OF THE INVENTION

An image processing method according to an aspect of the present invention includes obtaining a first spectral characteristic value in a sample point on a stained sample based on a value of a pixel of a stained-sample image obtained by imaging the stained sample, the sample point corresponding to the pixel, the stained sample being stained with a predetermined staining dye and to be observed; obtaining gradual second spectral characteristic values on the staining dye; and estimating an amount of the staining dye in the sample point on the staining sample by using the second dye spectral characteristic values on the staining dye based on the first spectral characteristic value.

An image processing apparatus according to another aspect of the presenting invention includes a spectral characteristic obtaining unit that obtains a first spectral characteristic value in a sample point on a stained sample based on a value of a pixel of a stained-sample image obtained by imaging the stained sample, the sample point corresponding to the pixel, the stained sample being stained with a predetermined staining dye and to be observed; a dye spectral characteristic obtaining unit that obtains gradual second spectral characteristic values on the staining dye; and a dye amount estimating unit that estimates an amount of the staining dye in the sample point on the staining sample by using the second dye spectral characteristic values on the staining dye based on the first spectral characteristic value.

A computer-readable recording medium according to still another aspect of the present invention stores an image processing program including instructions. The instructions cause a computer execute obtaining a first spectral characteristic value in a sample point on a stained sample based on a value of a pixel of a stained-sample image obtained by imaging the stained sample, the sample point corresponding to the pixel, the stained sample being stained with a predetermined staining dye and to be observed; obtaining gradual second spectral characteristic values on the staining dye; and estimating an amount of the staining dye in the sample point on the staining sample by using the second dye spectral characteristic values on the staining dye based on the first spectral characteristic value.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
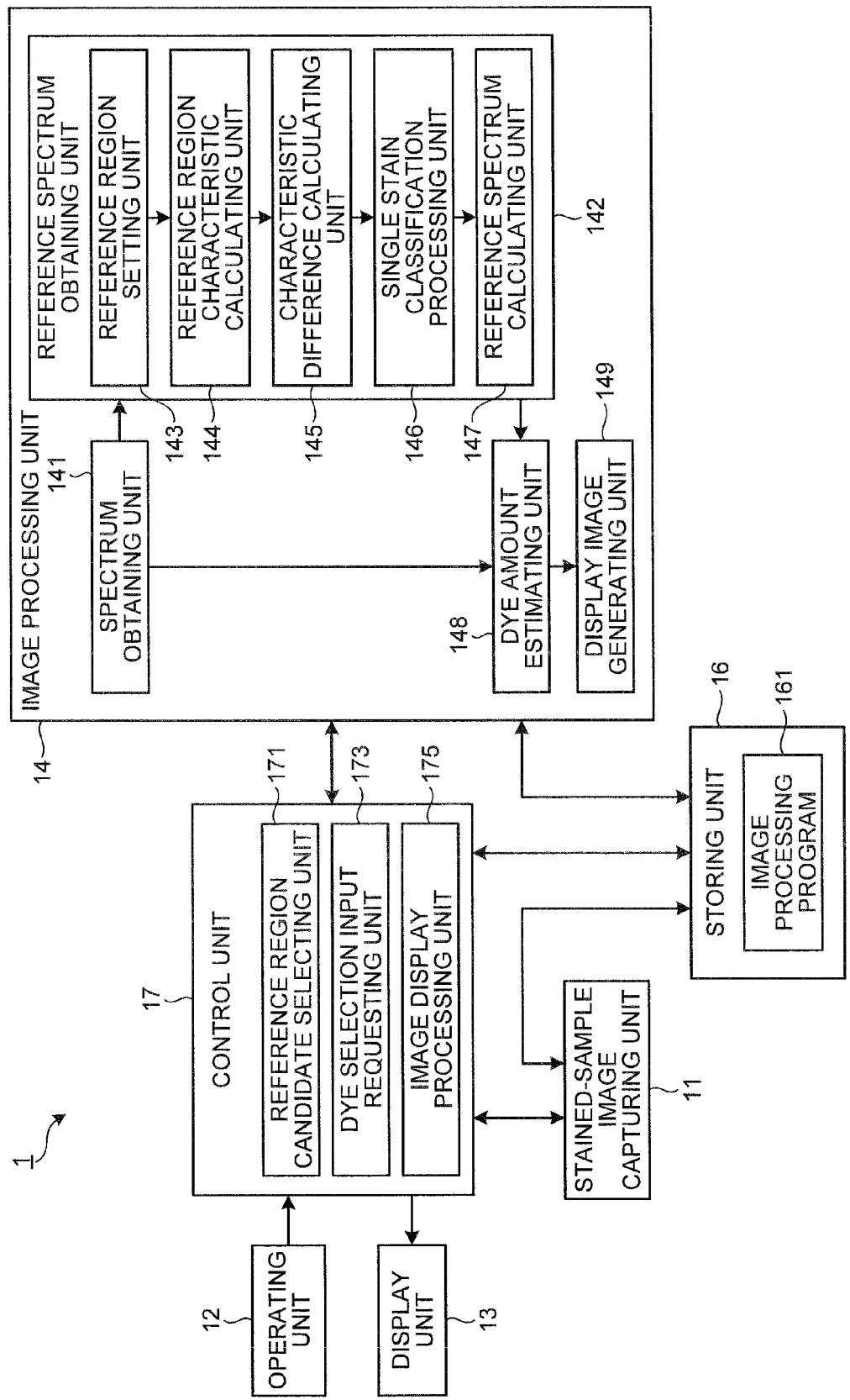
FIG. 1 is a block diagram showing a functional configuration of an image processing apparatus in a first embodiment.

Hereinbelow, preferred embodiments of the present invention will be described in detail with reference to the attached drawings. In this embodiment, an H&E-stained pathological sample (living tissue sample) will be described as an example of a stained sample as an object to be observed. An image processing apparatus for performing multiband imaging on the stained sample as a subject and estimating a dye amount in each of the points (sample points) in the stained sample on the basis of an obtained multiband image will be described. The present invention is not limited to the embodiment. In the drawings, the same reference numerals are designated to the same components.

In the embodiment, a stained sample subjected to H&E staining is an object to be observed as described above. Consequently, dyes with which a stained sample is stained are the dye H and the dye E. However, in an actual stained sample, in addition to tissues having absorbing components of the staining dyes, tissues such as red blood cells having absorbing components at the unstaining time may exist. Specifically, a red blood cell has its peculiar color even in a state where staining is not performed. After the H&E staining, the color is observed as the color of the red blood cell itself. The following description is based on assumption that there are three kinds of staining dyes; the dye H, the dye E, and the color of a red blood cell itself (hereinbelow, referred to as "dye R").

FIG. 1 is a block diagram showing a functional configuration of an image processing apparatus 1 in the first embodiment. The image processing apparatus 1 of the first embodiment has a stained-sample image capturing unit 11 for capturing a stained-sample image, an operating unit 12, a display unit 13, an image processing unit 14, a storing unit 16, and a control unit 17 for controlling the components of the apparatus. The configuration except for the stained-sample image capturing unit 11 can be realized by a general computer such as a workstation or a personal computer.

The stained-sample image capturing unit 11 is constructed by a multiband camera for capturing an observation image of a stained sample to be imaged in multiple bands. Concretely, for example, the stained-sample image capturing unit 11 is constructed by a tunable filter, a two-dimensional CCD camera, a filter controller for adjusting a wavelength of light passing through the tunable filter, a camera controller for controlling the two-dimensional CCD camera, and the like. In the first embodiment, a stained sample to be observed (hereinbelow, called "observation stained sample"), a single stained sample which is stained with a single staining dye, and an unstained sample which is not stained are objects to be imaged. The unstained sample is colorless and clear as a whole and has a color in a region of a red blood cell. The unstained sample corresponds to a single stained sample stained only with the dye R. In the following, the unstained sample will be called "R single stained sample". That is, the single stained samples to be imaged in the first embodiment are three kinds of samples; a single stained sample which is stained only with the dye H (hereinbelow, called "H single stained sample"), a single stained sample which is stained only with the dye E (hereinbelow, called "E single stained sample"), and the R single stained sample as the unstained sample.

The stained-sample image capturing unit 11 is connected to an optical microscope by which a stained sample can be observed using the transmission technique. The optical microscope has a light source for emitting illumination light, an objective lens, an electric stage, an illumination optical system, an objective lens, and an observation optical system. The optical microscope illuminates a stained sample with illumination light from the light source by the illumination optical system and, in cooperation with the objective lens, makes an observation image of the stained sample formed by the observation optical system. The electric stage on which a stained sample is mounted moves in the optical axis direction of the objective lens and in a plane perpendicular to the optical axis direction. The illumination optical system is provided to illuminate a stained sample on the electric stage. The observation optical system is provided to form an observation image of the stained sample.

The stained-sample image capturing unit 11 projects the observation image of the stained sample to be observed by the optical microscope onto an image capturing device of the two-dimensional CCD camera via the tunable filter and performs multiband imaging to obtain a stained-sample image. The tunable filter is a filter capable of electrically adjusting wavelength of transmission light and selecting a wavelength band having an arbitrary width of 1 nm or more (hereinbelow, called "selection wavelength width") in the first embodiment. For example, commercially available product such as a liquid crystal tunable filter "VariSpec filter" manufactured by Cambridge Research & Instrumentation, Inc. can be appropriately used. For example, the stained-sample image capturing unit 11 captures the observation image of the stained sample while sequentially selecting a wavelength band every predetermined selection wavelength width by the tunable filter to obtain a stained-sample image as a multiband image.

A pixel value in the stained-sample image obtained by the stained-sample image capturing unit 11 corresponds to intensity of light in the wavelength band selected by the tunable filter, and the pixel value of the wavelength band selected with respect to each of the sample points of the stained sample is obtained. Each of the sample points of the stained sample denotes each position on the stained sample corresponding to pixels of the image capturing device on which the image is projected. In the following, it is assumed that each of the sample points on the stained sample corresponds to each of the pixel positions of the stained-sample image.

Although the configuration using the tunable filter has been described as the configuration of the stained-sample image capturing unit 11, the invention is not limited to the configuration. Any configuration may be employed as long as intensity information of light at each of the sample points in the stained sample to be captured is obtained. For example, a configuration may be employed, for performing multiband imaging on a stained sample by the frame sequential method while rotating and switching a predetermined number (for example, 16) of band-pass filters by a filter wheel by using the imaging method disclosed in Japanese Laid-open Patent Publication No. 7-120324.

The operating unit 12 is realized by, for example, a keyboard, a mouse, a touch panel, various switches, and the like, and outputs an operation signal according to an operation input to the control unit 17. The display unit 13 is realized by a flat panel display such as an LCD or EL display or a display device such as a CRT display, and displays various screens in accordance with display signals input from the control unit 17.

The image processing unit 14 is realized by hardware such as a CPU. The image processing unit 14 includes a spectrum obtaining unit 141 as a spectral characteristic obtaining unit and a single-stain spectral characteristic obtaining unit, a reference spectrum obtaining unit 142 as a dye spectral characteristic obtaining unit, a dye amount estimating unit 148, and a display image generating unit 149.

The spectrum obtaining unit 141 obtains a spectrum in each of the positions of pixels constructing the stained-sample image captured by the stained-sample image capturing unit 11.

The reference spectrum obtaining unit 142 obtains reference spectra of staining dyes (dyes H, E, and R) with which the observation stained sample is stained. As the reference spectrum of the dye R, a preset fixed value may be used. The reference spectrum obtaining unit 142 has a reference region setting unit 143, a reference region characteristic calculating unit 144 as a spectrum characteristic calculating unit, a characteristic difference calculating unit 145, a single stain classification processing unit 146 as a classifying unit, and a reference spectrum calculating unit 147 as a dye spectral characteristic calculating unit.

According to a user operation entered from the operating unit 12 in response to a selection input request by a reference region candidate selecting unit 171, the reference region setting unit 143 sets an H reference region in a stained-sample image of an H single stained sample (hereinbelow, called "H single stained-sample image"), sets an E reference region in a stained-sample image of an E single stained sample (hereinbelow, called "E single stained-sample image"), and sets an R reference region in a stained-sample image of an R single stained sample (hereinbelow, called "R single stained-sample image").

The reference region characteristic calculating unit 144 calculates a spectrum characteristic in each of the H reference region, the E reference region, and the R reference region set by the reference region setting unit 143.

The characteristic difference calculating unit 145 calculates a characteristic difference of each of the pixels out of the H reference region on the basis of the spectrum characteristic of the H reference region, calculates a characteristic difference of each of the pixels out of the E reference region on the basis of the spectrum characteristic of the E reference region, and calculates a characteristic difference of each of the pixels out of the R reference region on the basis of the spectrum characteristic of the R reference region.

On the basis of the characteristic differences of the pixels out of the H reference region, the single stain classification processing unit 146 classifies pixels in the H single stained sample image into a plurality of dye classes at a plurality of hierarchical levels. On the basis of the characteristic differences of the pixels out of the E reference region, the single stain classification processing unit 146 classifies pixels in the E single stained sample image into a plurality of dye classes at a plurality of hierarchical levels. On the basis of the characteristic differences of the pixels out of the R reference region, the single stain classification processing unit 146 classifies pixels in the R single stained sample image into a plurality of dye classes at a plurality of hierarchical levels.

The reference spectrum calculating unit 147 calculates a reference spectrum for each of the dye classes classified by the single stain classification processing unit 146 and obtains a plurality of reference spectra on the dye class unit basis on each of the dyes H, E, and R.

On the basis of the spectrum obtained with respect to each of the pixel positions of the stained-sample image of the observation stained-sample by the spectrum obtaining unit 141, the dye amount estimating unit 148 estimates dye amounts of the observation stained sample by using the plurality of reference spectra on the dye class unit basis on each of the dyes H, E, and R obtained by the reference spectrum obtaining unit 142. The display image generating unit 149 generates an image for displaying the observation stained sample (display image).

The storing unit 16 is realized by an information storing medium such as various IC memories including ROM and RAM such as a rewritable flash memory, a hard disk which is built internally or connected by a data communication terminal, and a CD-ROM, a reader for the medium, and the like. In the storing unit 16, a program for making the image processing apparatus 1 operate and realizing various functions of the image processing apparatus 1, and data or the like used during execution of the program is temporarily or permanently stored. In the storing unit 16, an image processing program 161 for estimating a dye amount in each of the sample positions in the observation stained sample is stored.

The control unit 17 is realized by hardware such as a CPU. The control unit 17 gives instructions and transfers data to the components of the image processing apparatus 1 on the basis of an operation signal input from the operating unit 12, image data input from the stained-sample image capturing unit 11, the program and data stored in the storing unit 16, and the like, and controls the operation of the entire image processing apparatus 1 in a centralized manner.

The control unit 17 includes a reference region candidate selecting unit 171, a dye selection input requesting unit 173 as a dye class selection requesting unit, and an image display processing unit 175 as a display processing unit. The reference region candidate selecting unit 171 performs a process of requesting for an input to designate a seeds region on the staining dye unit basis, and receives an operation of designating a seeds region by the user such as a pathologist or clinical laboratory technician via the operating unit 12. The reference region candidate selecting unit 171 selects a candidate region (reference region candidate) for each of the reference regions (H reference region, E reference region, and R reference region) of the staining dyes on the basis of the designated seeds region. The dye selection input requesting unit 173 performs a process of requesting for a selective input of a dye to be displayed, and receives an operation of selecting a dye to be displayed by the user via the operating unit 12. The image display processing unit 175 performs a process of displaying, for example, a display image of an observation stained-sample on the display unit 13.

Figure 2:
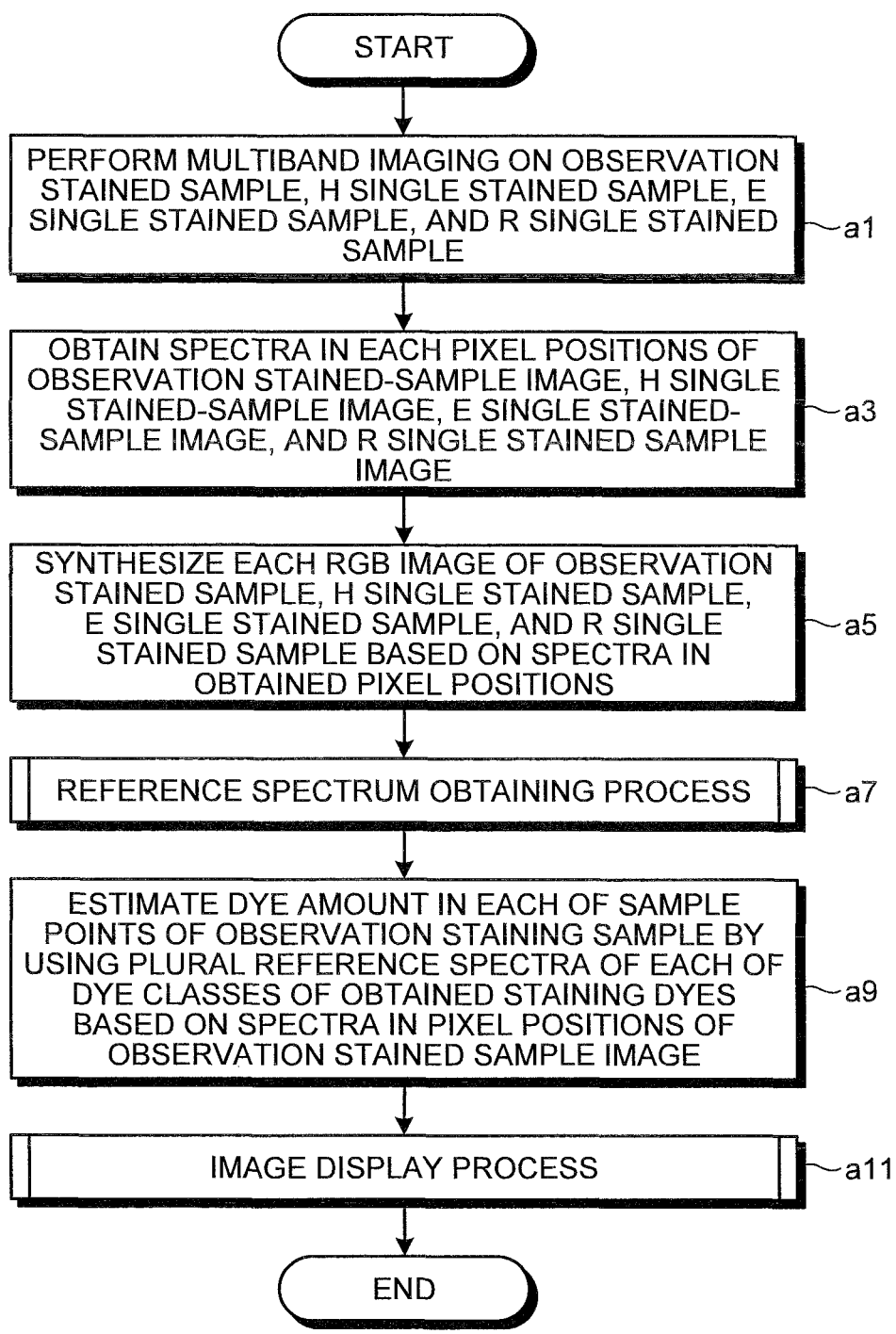
FIG. 2 is a flowchart showing a procedure performed by the image processing apparatus in the first embodiment.

FIG. 2 is a flowchart showing a procedure performed by the image processing apparatus 1 of the first embodiment. The process described here is realized when the components of the image processing apparatus 1 operate according to the image processing program 161 stored in the storing unit 16.

In the first embodiment, as shown in FIG. 2, first, the control unit 17 controls the operation of the stained-sample image capturing unit 11 to sequentially perform multiband imaging on the observation stained-sample, H single stained-sample, E single stained-sample, and R single stained-sample (step a1). Image data of stained-sample images of the obtained observation stained-sample, H single stained-sample, E single stained-sample, and R single stained-sample is stored in the storing unit 16.

Subsequently, the spectrum obtaining unit 141 obtains the spectrum in each of the pixel positions in each of the stained-sample image of the observation stained-sample (hereinbelow, called "observation stained-sample image"), H single stained-sample image, E single stained-sample image, and R single stained-sample image (step a3). For example, the spectrum obtaining unit 141 sequentially sets stained-sample images as objects to be processed, which are an observation stained-sample image, an H single stained-sample image, an E single stained-sample image, and an R single stained-sample image. By estimating the spectrum in a sample point on a stained sample corresponding to each of the pixels constructing the stained-sample image to be processed, the spectra in the pixel positions are obtained.

The detailed spectrum estimating procedure will be described. As shown by Equation (1), spectral transmittance $t(x,\lambda)$ in a sample point on a stained sample is obtained by dividing a pixel value $I(x,\lambda)$ in an arbitrary pixel position (x) expressed by a position vector x in a stained-sample image captured by the multiband imaging by a pixel value $I_0(x,\lambda)$ in a corresponding pixel position (x) in a multiband image of a background (illumination light).

$$t(x, \lambda) = \frac{I(x, \lambda)}{I_0(x, \lambda)} \qquad (1)$$

In reality, the wavelength λ can be observed only discretely. Consequently, when the number of sample points in the wavelength direction is M, the spectral transmittance $t(x,\lambda)$ is expressed as an M-dimensional vector as shown by the following Equation (5). $[\ ]^t$ expresses a transposed matrix.

$$t(x,\lambda)=[t(x,\lambda_1)t(x,\lambda_2)\ldots t(x,\lambda_M)]^t \quad (5)$$

The obtained spectral transmittance $t(x,\lambda)$ can be converted to spectral absorbance $a(x,\lambda)$ in accordance with the following Equation (6). Hereinbelow, the spectral absorbance will be simply called "absorbance".

$$a(x,\lambda)=-\log(t(x,\lambda)) \quad (6)$$

In the first embodiment, the spectrum obtaining unit 141 calculates the spectral transmittance $t(x,\lambda)$ in accordance with Equation (5) and performs a process of converting the spectral transmittance $t(x,\lambda)$ to the absorbance $a(x,\lambda)$ in accordance with Equation (6) on each of all of pixels of the observation stained-sample image, H single stained-sample image, E single stained-sample image, and R single stained-sample image to obtain the absorbance $a(x,\lambda)$ as the spectrum in each pixel position (x). The data of the spectrum (the absorbance $a(x,\lambda)$) in each of the pixel positions (x) in the obtained observation stained-sample image, H single stained-sample image, E single stained-sample image, and R single stained-sample image is stored in the storing unit 16 together with data of the spectral transmittance $t(x,\lambda)$ in each pixel position (x) calculated in the obtaining process.

After that, as shown in FIG. 2, on the basis of the spectra in the pixel positions in each of the obtained stained-sample images, the spectrum obtaining unit 141 combines an RGB image of each of the observation stained sample, H single stained sample, E single stained sample, and R single stained sample (step a5). Image data of synthetic RGB images of each of the observation stained sample, H single stained sample, E single stained sample, and R single stained sample is stored in the storing unit 16 and properly displayed on the display unit 13 so as to be presented to the user. In the following, the RGB images of the single stained samples will be called "single stained RGB images", and the RGB image of the observation stained sample will be called "observation stained RGB image".

Concretely, the spectrum obtaining unit 141 sequentially sets stained-sample images as objects to be processed, which are an observation stained-sample image, an H single stained-sample image, an E single stained-sample image, and an R single stained-sample image. The spectrum obtaining unit 141 converts the spectral transmittance calculated in the process of obtaining the spectrum in each of the pixel positions of the stained-sample image to be processed to an RGB value, and obtains an RGB image. When the spectral transmittance in an arbitrary pixel position (x) on a stained-sample image is T(x), an RGB value $G_{RGB}(x)$ is expressed by the following Equation (7).

$$G_{RGB}(x)=HT(x) \quad (7)$$

Here, H in Equation (7) denotes a matrix defined by the following Equation (8). The matrix H is also called a system matrix, F denotes spectral transmittance of the tunable filter, S denotes spectral sensitivity characteristic of a camera, and E denotes spectral emission characteristic.

$$H=FSE \quad (8)$$

Figure 3:
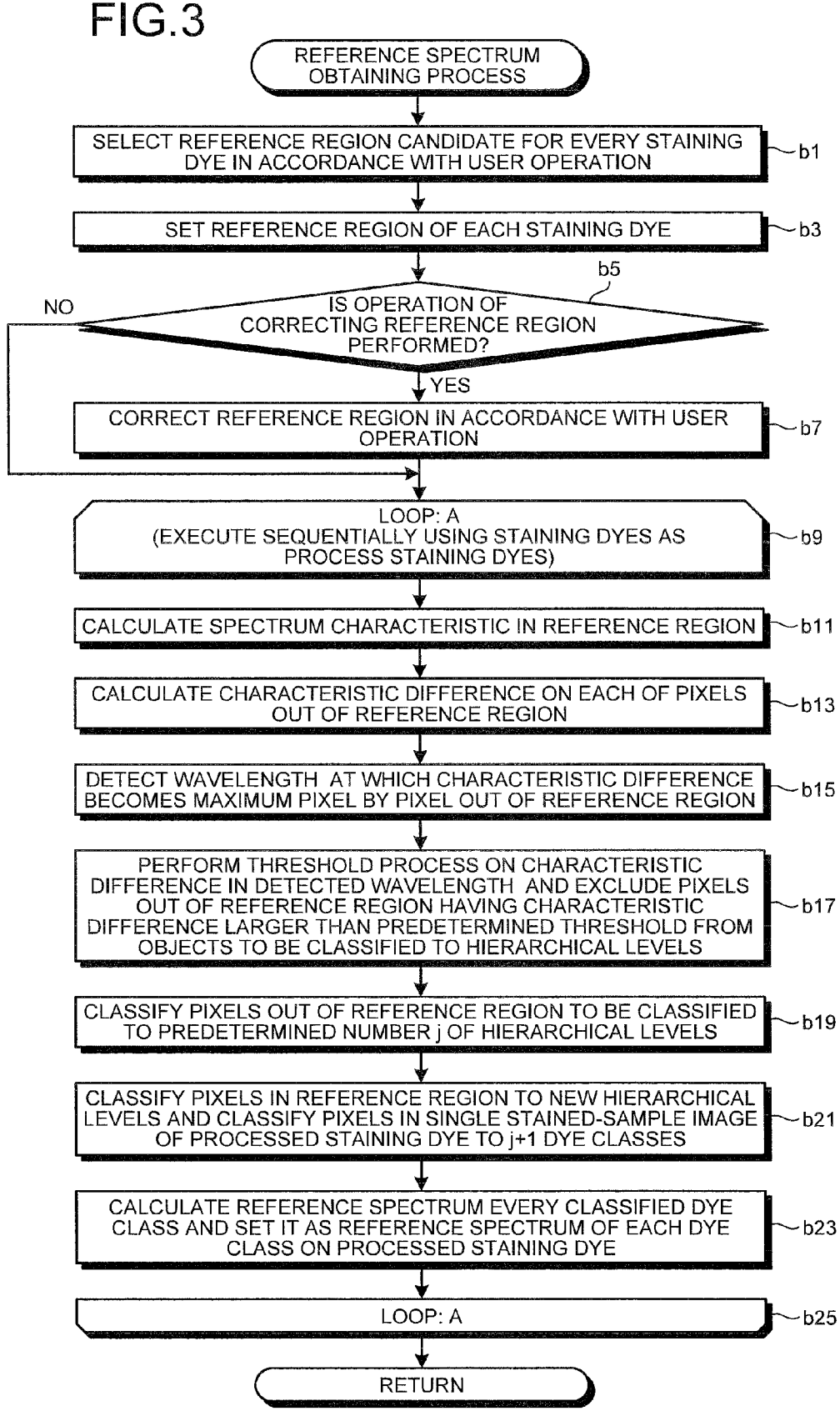
FIG. 3 is a flowchart showing a detailed procedure of a reference spectrum obtaining process.

Subsequently, as shown in FIG. 2, the apparatus moves to a reference spectrum obtaining process (step a7). FIG. 3 is a flowchart showing a detailed procedure of the reference spectrum obtaining process.

As shown in FIG. 3, in the reference spectrum obtaining process, first, the reference region candidate selecting unit 171 selects a reference region candidate for each staining dye in accordance with a user operation (step b1). For example, the reference region candidate selecting unit 171 displays a reference region selection screen on the display unit 13, and performs a process of notifying the user of an input request to designate a seeds region of each of the dyes H, E, and R. The reference region candidate selecting unit 171 selects a reference region candidate on the basis of a seeds region designated for each of the staining dyes by the user in response to the notification of the designation input request, and notifies the reference region setting unit 143 of the selected information.

Figure 4:
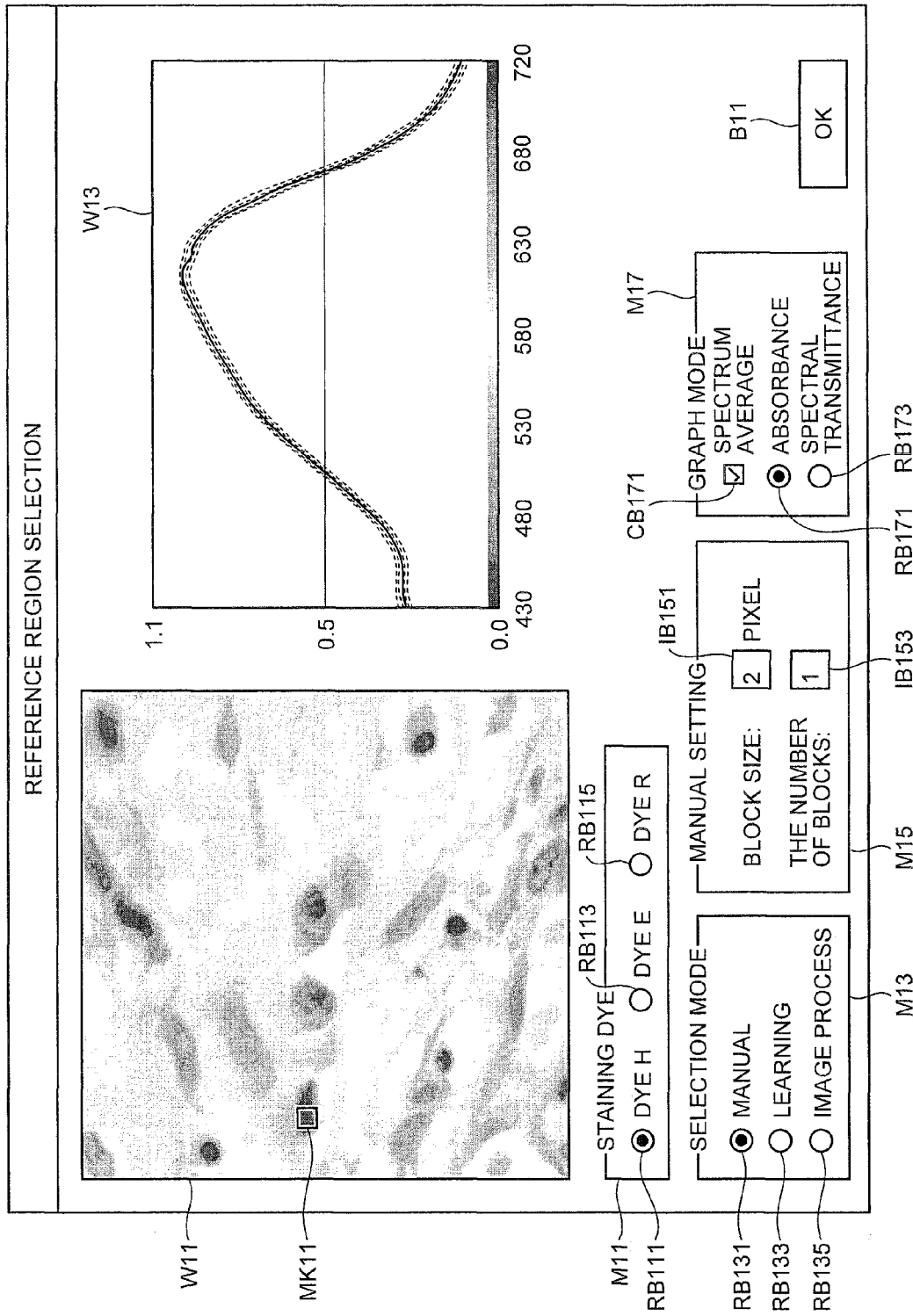
FIG. 4 is a diagram showing an example of a reference region selecting screen.

FIG. 4 is a diagram showing an example of the reference region selection screen. As shown in FIG. 4, the reference region selection screen has a single stained-image display part W11. In the single stained-image display part W11, a single stained RGB image synthesized with respect to a staining dye to be selected (dye to be selected) in step a5 in FIG. 2 is displayed. The dye to be selected can be selected in a staining dye menu M11. In the staining dye menu M11, radio buttons RB111, RB113, and RB115 by which the dye H, E, or R can be selected alternatively are disposed. When the dye H is selected by the radio button RB111 as shown in FIG. 4, a single stained RGB image of the dye H is displayed in the single stained image display part W11. Similarly, when the dye E is selected by the radio button RB113, a single stained RGB image of the dye E is displayed in the single stained image display part W11. When the dye R is selected by the radio button RB115, a single stained RGB image of the dye R is displayed in the single stained image display part W11.

The reference region selection screen also has a selection mode menu M13, a manual setting menu M15, and a graph mode menu M17. In addition, in the reference region selection screen, an OK button B11 for determining an operation is disposed.

In the selection mode menu M13, radio buttons RB131, RB133, and RB135 by which one of "manual", "learning", and "image process" can be alternatively selected as a selection mode of the reference region candidate are disposed. The mode "manual" is a selection mode of manually selecting a reference region candidate in accordance with a user operation. For example, the user selects the seeds region designated on the single stained image display part W11 as a reference region candidate of the dye to be selected. The mode "learning" is a selection mode of automatically selecting a reference region candidate of a dye to be selected on the basis of a learning condition which is preliminarily learned. The mode "image process" is a selection mode of automatically selecting a reference region candidate of a dye to be selected on the basis of a preset selecting condition.

In the manual setting menu M15, a setting related to "manual" as one of the selection modes is made. For example, in the manual setting menu M15, an input box IB151 for entering a block size and an input box IB153 for entering the number of blocks are disposed. In each of the boxes, a desired value can be set. The block size is a size of the seeds region designated in the single stained-image display part W11. For example, in the case where "2" is entered in the input box IB151 as shown in FIG. 4, one seeds region has a size of 2×2 pixels. A plurality of seeds regions can be designated, and the number of seeds regions corresponds to the number of blocks. The user enters a desired number of blocks in the input box IB153 ("1" in FIG. 4).

In the case where the selection mode is "manual", when a seeds region is designated in the single stained-image display part W11, a spectrum obtained in the pixel position is displayed in the form of a graph in a graph display part W13. In the graph mode menu M17, a setting related to the graph display in the graph display part W13 is made. For example, in the graph mode menu M17, a check box CB171 for displaying a spectrum average graph of the seeds region designated in the single stained-image display part W11 in the graph display part W13 is disposed. In the case where the check box CB171 is not checked, a spectrum graph in each of the positions of pixels constructing the seeds region is displayed. For example, in the case where the input value in the input box IB151 in the manual setting menu M15 is "2", the seeds region is constructed by four pixels, and a spectrum graph obtained by plotting a spectrum obtained every wavelength in each of the positions of the four pixels is displayed. On the other hand, in the case where the check box CB171 is checked, together with a spectrum graph in each of the positions of the pixels constructing the seeds region, a spectrum average graph obtained by plotting an average value obtained every wavelength of the spectrum is displayed. For example, in the graph display part W13 in FIG. 4, spectrum graphs in the pixel positions indicated by broken lines and a spectrum average graph expressed by the solid line are displayed.

In the graph mode menu M17, radio buttons RB171 and RB173 by which an absorbance graph or a spectral transmittance graph can be alternatively selected as a kind of a spectrum graph to be displayed in the graph display part W13 are disposed. When the absorbance is selected by the radio button RB171, the absorbance as the spectrum obtained in each of the pixel positions in the seeds region is displayed in the form of a graph. On the other hand, when the spectral transmittance is selected by the radio button RB173, the spectral transmittance calculated in the process of obtaining absorbance is displayed in the form of a graph.

For example, as an operation procedure in the case of selecting "manual" as the selection mode and selecting a reference region candidate, first, the user clicks a desired position in the single stained-image display part W11 with the mouse as a component of the operating unit 12 to designate a seeds region. At this time, in the single stained-image display part W11, a marker MK11 indicative of a seeds region is displayed in the designated (clicked) position. In the graph display part W13, the graphs of spectra in the pixel positions constructing the seeds region are displayed. The seeds region once designated can be moved by performing, for example, a drag-and-drop operation on the marker MK11 in the single stained-image display part W11. Consequently, the user can designate a seeds region while recognizing the spectrum in the graph display part W13. In the case where a value of 2 or larger is input as the number of blocks, by re-clicking another position in the single stained-image display part W11, a new seeds region is designated. In the case of settling the operation, the OK button B11 is clicked.

After settling the operation as described above, as the process in step b1 in FIG. 3, the reference region candidate selecting unit 171 selects the designated seeds region (the pixel position of the marker MK11 in the single stained-image display part W11) as a reference region candidate of a dye to be selected. The reference region candidate selecting unit 171 notifies the reference region setting unit 143 in the image processing unit 14 of the information of the selection of the reference region candidate. The information of the selection of the reference region candidate includes, for example, information for identifying the dye to be selected (the dye H, E, or R) and pixel position of the reference region candidate.

The case where the reference region candidate selecting unit 171 selects the seeds region designated by the user as a reference region candidate has been described. On the other hand, the reference region candidate selecting unit 171 may determine the degree of similarity with the seeds region designated by the user for each of the pixels of a single stained-RGB image of the dye to be selected. The degree of similarity can be determined by, for example, obtaining the difference between a brightness value of each of the pixels of the single stained RGB image of the dye to be selected and that of the seeds region. In the case where the seeds region is constructed by a plurality of pixels, the degree of similarity may be determined by comparing the brightness value of each pixel with brightness value average or brightness value dispersion in the seeds region. The degree of similarity may be determined by comparing a color distribution of each pixel with a color distribution of the seeds region. Alternatively, the degree of similarity may be determined by comparing the spectral waveform (spectrum graph) of a spectrum obtained in the position of each pixel with the spectral waveform (spectrum graph) of a spectrum obtained in the position of a pixel in the seeds region.

The reference region candidate selecting unit 171 may calculate, as a coupling area, the number of couplings with other pixels determined as pixels having high degree of similarity, with respect to a pixel determined as a pixel having high degree of similarity to the seeds region, in pixels of the single stained RGB image of the dye to be selected. The region of a pixel having predetermined coupling area or larger (the number of coupling of pixels determined as pixels having high degree of similarity is equal to or larger than predetermined number) may be selected as a reference region candidate.

In the case where "learning" is selected as the selection mode in the selection mode menu M13 in the reference region selection screen of FIG. 4, a process of extracting a pixel position in accordance with a predetermined learning condition is performed as an internal process, thereby selecting a reference region candidate. As a learning condition, for example, a condition preliminarily learned by a learning process such as a representative spectral characteristic pattern of a tissue characteristically stained by a staining dye, or color information of a tissue characteristically stained is set.

In the case of selecting "image process" as the selection mode, a process of extracting a pixel position satisfying a predetermined selecting condition is performed as an internal process, and a reference region candidate is selected. The selecting condition can be set on the basis of the pixel value in a single stained RGB image of the dye to be selected. For example, a brightness average value of pixels constructing the single stained RGB image may be used as a selecting condition. It is also possible to generate a histogram, calculate a distribution mode value, and use the value as a selecting condition. A combination of any of the conditions may be used as a selecting condition. Another value determined by an RGB value may be properly used to set a selecting condition.

When the reference region candidate is selected, subsequently, as shown in FIG. 3, the reference region setting unit 143 sets a reference region of each of the staining dyes (step b3). For example, on the basis of the information of selection of the reference region candidate notified from the reference region candidate selecting unit 171, the reference region setting unit 143 sets a reference region of a dye to be selected by performing a process of retrieving a pixel whose pixel value is similar to the reference region candidate, in the single stained RGB image of the dye to be selected which is set in the selection information.

As a concrete procedure, first, the reference region setting unit 143 maps each of the pixel values of a single stained RGB image of a dye to be selected into an RB color space. In the case where the reference region candidate is constructed by a plurality of pixel positions, for example, an average value of mapping points of pixels constructing the reference region candidate (an average value of coordinate values in the RB color space of pixels of the reference region candidate) is calculated and set as a reference region candidate representative point.

Subsequently, the reference region setting unit 143 sequentially sets each of the pixels other than the reference region candidate as an object to be processed and calculates a distance, Dist, between the mapping point of the reference region candidate (or a reference region candidate representative point) and a mapping point of a pixel to be processed. The obtained distance Dist is obtained as the degree of similarity of the pixel to be processed. When the mapping point of the reference region candidate (or the reference region candidate representative point) is set as S(R,B) and a mapping point (coordinate value in the RG color space) of a pixel $(x_i,y_i)$ (i=1, 2, ..., n) to be processed is set as $S(r_i,b_i)$, the distance between $S(r_i,b_i)$ and S(R,B) is expressed by the following Equation (9). Here, n denotes the number of pixels other than the reference region candidate to be processed.

$$Dist = \sqrt{(R-r_i)^2 + (B-b_i)^2} \quad (9)$$

The reference region setting unit 143 processes the degree of similarity of each of the pixels other than the obtained reference region candidate to extract a pixel having high degree of similarity (for example, a pixel whose degree of similarity is equal to or larger than a predetermined threshold). The reference region setting unit 143 sets a region constructed by the extracted pixel and pixels in the reference region candidate as a reference region. A threshold STh used for a threshold process is set on the basis of the pixel value of the reference region candidate in the single stain RGB image. For example, in the case where the reference region candidate is constructed by a plurality of pixel positions, variance V(S) of the mapping point (coordinate value in the RB color space) of each pixel is obtained and the threshold STh is set according to the following Equation (10). f denotes a coefficient which can be arbitrarily set.

$$STh = S(R,B) + f\sqrt{V(S)} \quad (10)$$

The method of calculating the degree of similarity is not limited to the above method but a method can be properly selected and used. For example, the degree of similarity of the brightness value, the degree of similarity of the color distribution, the degree of similarity of a spectrum, or the like is calculated. One of them may be calculated or a plurality of the degrees of similarity may be combined to calculate a total degree of similarity.

The reference region of the dye to be selected, which is set as described above is displayed for confirmation on the display unit 13 and presented to the user. For example, the reference region candidate selecting unit 171 performs a process of displaying a reference region confirmation screen on the display unit 13. The reference region candidate selecting unit 171 performs a process of notifying the user of a request to enter correction on the reference region.

Figure 5:
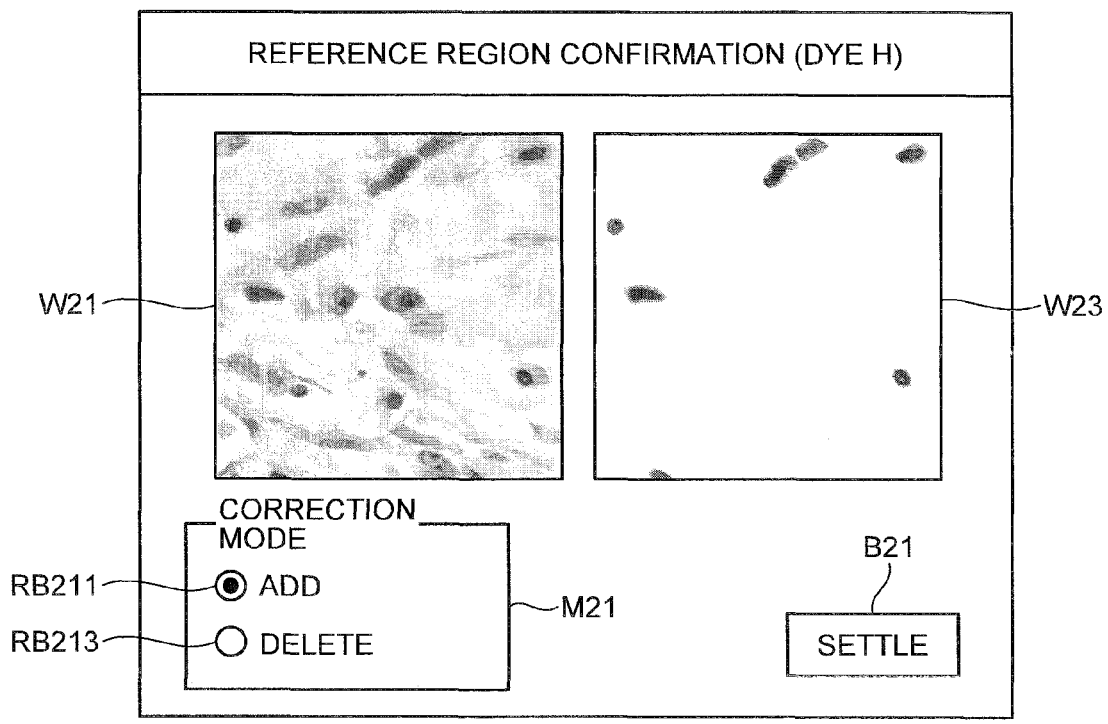
FIG. 5 is a diagram showing an example of a reference region confirming screen.

FIG. 5 is a diagram showing an example of the reference region confirmation screen. As shown in FIG. 5, the reference region confirmation screen includes a single stained-image display part W21 and a reference region display part W23. In the single stained-image display part W21, a single stained RGB image of the dye to be selected (the dye H in FIG. 5) is displayed. In the reference region display part W23, a reference region identification image for identifying and displaying a reference region in the single stained RGB image is displayed. For example, an image obtained by replacing pixel values out of the reference region with a predetermined color (such as white) so that the pixels on the outside of the reference region are not shown is displayed.

The reference region confirmation screen has a correction mode menu M21. In the case where it is determined that the set reference region has excess or deficiency and is insufficient, a correction can be made. In the correction mode menu M21, as modes for correcting the reference region, radio buttons RB211 and RB213 by which "add" or "delete" can be alternatively selected are disposed as the reference region correction modes. In addition, a settle button B21 for settling the operation is disposed in the reference region confirmation screen.

For example, in the case where the user determines that a setting of the reference region is insufficient by seeing the reference region identification image in the reference region display part W23, the user selects the radio button RB211 and clicks, for example, the position of a pixel desired to be added (addition pixel) as a reference region on the single stained image display part W21. On the other hand, when the user determines that the reference region is excessively set by seeing the reference region identification image in the reference region display part W23, the user selects the radio button RB213 and clicks, for example, the position of a pixel desired to be deleted (deletion pixel) from the reference region on the single stain image display part W21. In the case of settling the operation, the settle button B21 is clicked.

When a correcting operation is entered in response to the notification of the correction input request as described above (Yes in step b5 in FIG. 3), the reference region candidate selecting unit 171 notifies the reference region setting unit 143 of the correction information. The correction information includes the identification information of a dye to be selected, the position of a pixel designated as an addition pixel, and the position of a pixel designated as a deletion pixel. The reference region setting unit 143 corrects a reference region of a dye to be selected in accordance with the correction information (step b7).

For example, in the case where an addition pixel is set in the correction information, the reference region setting unit 143 extracts a pixel similar to the addition pixel and coupled to the addition pixel on the basis of the pixel value of the single stained RGB image of the dye to be selected. For example, the reference region setting unit 143 performs the threshold process on the brightness value of a pixel adjacent to the addition pixel in order. The threshold is set on the basis of, for example, the brightness value of the addition pixel. Pixels whose brightness values are similar to the brightness value of the addition pixel are extracted as long as they are coupled to the addition pixel. The reference region setting unit 143 adds the pixels extracted in such a manner to the reference region. On the other hand, in the case where the deletion pixel is set in the correction information, a pixel similar to the deletion pixel and coupled to the deletion pixel is extracted on the basis of the pixel value of the single stained RGB image of the dye to be selected. For example, the reference region setting unit 143 performs the threshold process on the brightness value of a pixel adjacent to the deletion pixel in order. The threshold is set on the basis of, for example, the brightness value of the deletion pixel. Pixels whose brightness values are similar to the brightness value of the deletion pixel are extracted as long as they are coupled to the deletion pixel. The reference region setting unit 143 deletes the pixels extracted in such a manner from the reference region.

Finally, the reference region setting unit 143 gives a reference region label to the pixel positions of the pixels constructing the reference region which is set/corrected for each of the staining dyes as described above. That is, the reference region setting unit 143 gives a reference region label $L_H$ to pixel positions of the H reference region as the reference region set for the dye H as the dye to be selected. Similarly, the reference region setting unit 143 gives a reference region label $L_E$ to pixel positions of the E reference region as the reference region set for the dye E as the dye to be selected, and gives a reference region label $L_R$ to pixel positions of the R reference region as the reference region set for the dye R as the dye to be selected.

The reference region of each of the staining dyes (the H reference region, E reference region, and R reference region) is desirably a representative region in the corresponding single stained sample. A seeds region designated by the user on the reference region selection screen in FIG. 4 is desirably the representative region. For example, the dye H stains especially nuclei in tissues in a sample. Consequently, it is desirable that the position of a nucleus in an H single stained sample image be designated as a seeds region by the user, and the region of the nucleus in the H single stained-sample image be set as an H reference region. On the other hand, the dye E stains the cytoplasm. Consequently, it is desirable that the position of the cytoplasm in an E single stained sample image be designated as a seeds region by the user, and the region of the cytoplasm in the E single stained-sample image be set as an H reference region. However, the invention is not limited to the above. The user may designate a desired position as the seeds region regardless of a tissue.

Subsequently, as shown in FIG. 3, the reference spectrum obtaining unit 142 executes processes in a loop A while sequentially setting staining dyes as process staining dyes (steps b9 to b25). In the first embodiment, the processes in the loop A are performed for each of the dyes H, E, and R.

Specifically, in the loop A, first, the reference region characteristic calculating unit 144 calculates a spectrum characteristic of a reference region which is set with respect to the process staining dye set in step b3 and corrected in step b7 (the pixel position to which the reference region label of the process staining dye is given) (step b11). For example, in the case where the process staining dye is the dye H, the spectrum characteristic in the pixel position to which the reference region label $L_H$ as the H reference region is given is calculated. Similarly, in the case where the process staining dye is the dye E, the spectrum characteristic in the pixel position to which the reference region label $L_E$ as the E reference region is given is calculated. In the case where the process staining dye is the dye R, the spectrum characteristic in the pixel position to which the reference region label $L_R$ as the R reference region is given is calculated.

As an example of the concrete calculating procedure, a method of calculating a spectrum characteristic on the basis of a main component of the reference region in the absorbance space will be described. First, the reference region characteristic calculating unit 144 analyzes a main component of the reference region in the absorbance space. In the main component analysis, a spectrum obtained by the spectrum obtaining unit 141 with respect to a pixel as a component of the reference region of the process staining dye (a pixel in the pixel position to which the reference region label of the process staining dye is given) is used. When pixels in the reference region are expressed as i (i=1, 2, 3, ..., n) and the number of wavelengths of the spectrum is D, an absorbance vector $A(\lambda)$ is expressed by the following Equation (11).

$$A(\lambda) = \begin{bmatrix} a_1(\lambda_1) & a_1(\lambda_2) & \cdots & a_1(\lambda_D) \\ a_2(\lambda_1) & a_2(\lambda_2) & \cdots & a_2(\lambda_D) \\ \vdots & & \ddots & \vdots \\ a_n(\lambda_1) & a_n(\lambda_2) & \cdots & a_n(\lambda_D) \end{bmatrix} \quad (11)$$

An average vector $G(\lambda)$ of the absorbance vector $A(\lambda)$ is expressed by the following Equation (12).

$$G(\lambda) = [g(\lambda_1) g(\lambda_2) \ldots g(\lambda_D)] \quad (12)$$

where $$g(\lambda_D) = \frac{1}{n} \sum_{i=1}^{n} a_i(\lambda_d).$$

A variance-covariance matrix S of the absorbance vector $A(\lambda)$ is expressed by the following Equation (13).

$$S = \begin{bmatrix} s_{11} & s_{12} & \cdots & s_{1D} \\ s_{21} & s_{22} & \cdots & s_{2D} \\ \vdots & & \ddots & \vdots \\ s_{D1} & s_{D2} & \cdots & s_{DD} \end{bmatrix} \quad (13)$$

where $$S_{rc} = \frac{1}{n} \sum_{i=1}^{n} \sum_{r=1}^{D} \sum_{c=1}^{D} (a_i(\lambda_r) - g(\lambda_r)) \times (a_i(\lambda_c) - g(\lambda_c)).$$

The variance-covariance matrix S is a D×D dimensional matrix

The reference region characteristic calculating unit 144 solves an eigen equation in the following Equation (14) on the basis of the variance-covariance matrix S and obtains an eigen value $e_d$ (d=1, 2, ..., D). e expresses a real number, and X expresses an eigenvector.

$$SX = eX \quad (14)$$

The obtained eigen values $e_d$ are set as a first main component, a second main component, ..., the D-th main component in descending order, and the eigenvector $X_p$ (p= 1, 2, 3, ... D) belonging to the eigen value $e_d$ is calculated for each of the main components. The eigenvector $X_p$ calculated here is expressed by the following Equation (15).

$$x_p = \begin{bmatrix} x_{p1} \\ x_{p2} \\ \vdots \\ x_{pD} \end{bmatrix} \quad (15)$$

An equation of $Z_p$ of the main component expressed by the following Equation (16) as an equation obtained by multiplying a unit vector $\epsilon_i$ (i=1, 2, ..., D) of the corresponding main component with the eigenvector $X_p$ calculated for each main component as a coefficient is derived.

$$Z_p = x_{p1} \cdot \epsilon_1 + x_{p2} \cdot \epsilon_2 + \ldots + x_{pD} \cdot \epsilon_D + x_0 \quad (16)$$

The expression $Z_p$ of the main component expresses the characteristic of the absorbance distribution in the reference region (that is, the characteristic of the reference region). Since the higher-order main component has larger information amount, the degree of contribution in the characteristic expression is high. Consequently, the reference region characteristic calculating unit 144 determines a predetermined number of high-order main components which can sufficiently express the characteristic of the reference region on the basis of the result of the main component analysis obtained as described above. For example, the contribution ratio $R_i$ (i=1, 2, ..., D) is subjected to the threshold process to determine the number K of main components. First, the contribution ratio $R_i$ of each main component is calculated in accordance with the following Equation (17).

$$R_i = \frac{e_i}{\sum_{p=1}^{D} e_p} \quad (i = 1, 2, \ldots, D) \tag{17}$$

Then, calculated contribution ratio $R_i$ of each main component is sequentially subjected to the threshold process to determine the number K of main components. When the threshold used for the threshold process is Th, the number K of main components can be determined by the following Equation (18). The data of the determined number K of main components, from the first to D-th main components is stored in the storing unit 16.

$$\text{If } R_{i+1} > Th \geq R_i, \text{ then } K = i \tag{18}$$

Figure 6:
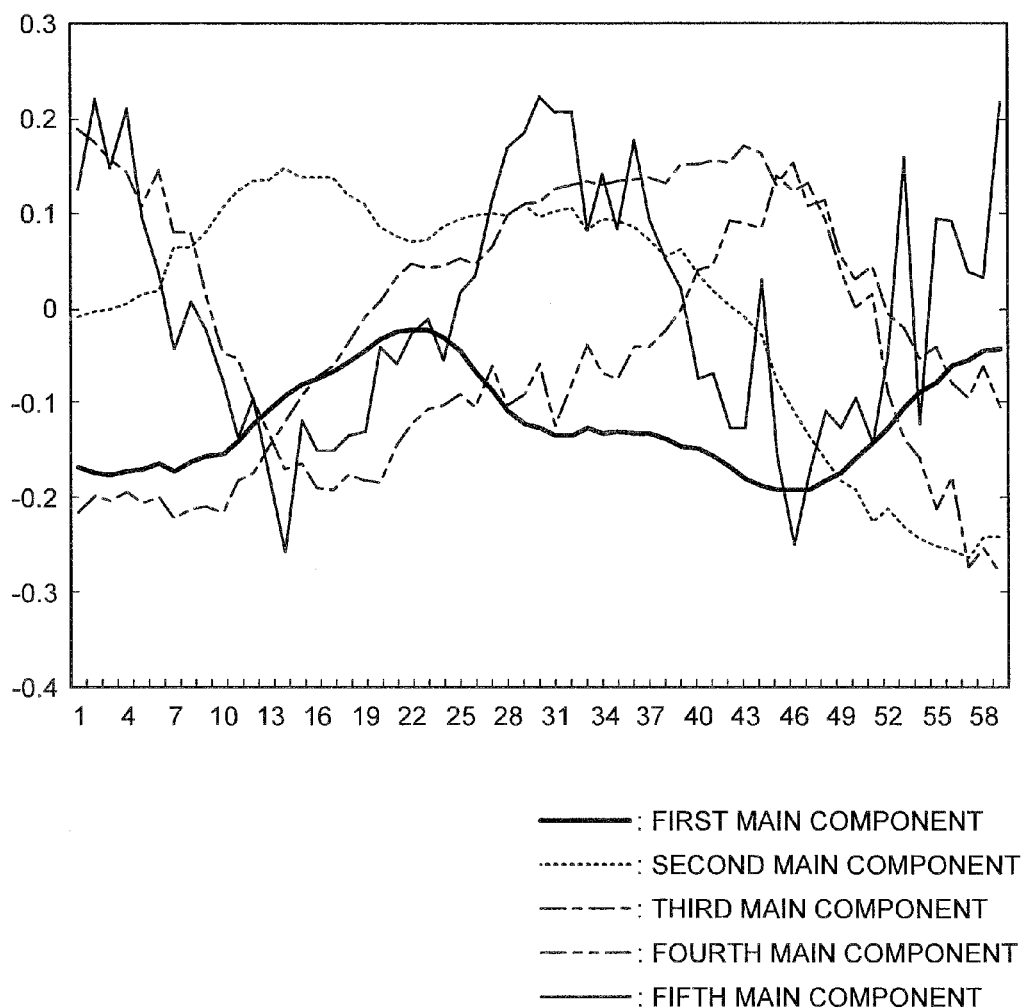
FIG. 6 is a graph showing results of analysis of principal components.

The method of determining the number K of main components is not limited to the above. For example, the value of K may be pre-set as a fixed value or may be set to be variable in accordance with a user operation. In the case of setting the value of K in accordance with a user operation, the control unit 17 may perform a process of displaying a result of the main component analysis on the display unit 13. For example, a main component analysis result screen in which the eigenvectors $X_p$ for the main components are displayed in a graph is displayed on the display unit 13 and, in addition, an entry of the number K of main components may be received. FIG. 6 is a diagram showing a graph as an example of the eigenvectors $X_p$ obtained as a result of the main component analysis. FIG. 6 shows graphs obtained by plotting the elements $x_p$ of the eigenvectors $X_p$ obtained with respect to the first to fifth five main components. By displaying the eigenvectors $X_p$ of the main components in the form of graphs, the user can determine the number K of main components while recognizing the graph shape.

In this case, the more the graph shape of the eigenvector $X_p$ of each main component is similar to the (known) waveform of the spectrum of the process staining dye, the larger the information amount on the characteristic of the process staining dye is included. The lower the order of the main component is, the more the noise components is included. Therefore, for the user, the graph shape of each main component is the material for determining the number K of main components.

After the first to D-th main components are obtained on the reference region of the process staining dye and the number K of main components is determined as described above, the reference region characteristic calculating unit 144 expresses a pixel as a component of the reference region of the process staining dye as (x,y) and calculates the spectrum difference $\Delta_d(x,y)$ with respect to each of the pixels (x,y) in the reference region. For example, by subtracting the absorbance component of the pixel (x,y) in the reference region reproduced by total K main components (the first to Kth main components) determined that they can sufficiently express the characteristic of the reference region (hereinbelow, the absorbance component reproduced by the first to Kth main components will be called "first to Kth main component spectrum") from the spectrum of the pixel (x,y) in the reference region, the spectrum difference $\Delta_d(x,y)$ of the pixel (x,y) in the reference region is obtained.

In this case, the spectrum of the pixel (x,y) corresponds to the absorbance component of the pixel (x,y) reproduced by the first to Dth main components (hereinbelow, the absorbance component reproduced by the first to Dth main components will be called "first to Dth main component spectrum"). Therefore, the spectrum difference $\Delta_d(x,y)$ corresponds to the absorbance component of the pixel (x,y) reproduced by the (K+1)th to Dth main components obtained by subtracting the upper K pieces of the first to Kth main components from the first to Dth main components (hereinbelow, the absorbance component reproduced by the (K+1)th to Dth main components will be called "K+1 to D main component spectrum"). The spectrum difference $\Delta_d(x,y)$ is expressed by the following Equation (19).

$$\text{Spectrum difference } \Delta_d(x, y) = \{\text{spectrum of pixel}(x, y)\} - \tag{19}$$
$$\{1 \text{ to } K \text{ main component spectrum}\}$$
$$= \{K + 1 \text{ to } D \text{ main component spectrum}\}$$

A concrete equation of calculating the spectrum difference $\Delta_d(x,y)$ will be described. A 1-to-D main component spectrum ABS $(\lambda_d)(x,y)$ in the pixel (x,y) is expressed by the following Equation (20) using the eigenvectors $X_P$ of the main components.

$$ABS(\lambda_d)(x,y) = c_1 X_1 + c_2 X_2 + \ldots + c_D X_D \tag{20}$$

Each of the coefficients $c_p$ (p=1, 2, ..., D) in Equation (20) is expressed by the following Equation (21).

$$c_1 = \lambda_1 \chi_{11} + \lambda_2 \chi_{12} + \cdots + \lambda_D \chi_{1D} \tag{21}$$
$$c_2 = \lambda_1 \chi_{21} + \lambda_2 \chi_{22} + \cdots + \lambda_D \chi_{2D}$$
$$\vdots$$
$$c_D = \lambda_1 \chi_{D1} + \lambda_2 \chi_{D2} + \cdots + \lambda_D \chi_{DD}$$

The spectrum difference $\Delta_d(x,y)$ is expressed by the following Equation (22) using the eigenvectors $X_p$ of the (K+1)th main component to the Dth main component and the coefficients $c_p$ on the (K+1)th main component to the Dth main component in Equation (21).

$$\Delta_d(x, y) = \sum_{p=K+1}^{D} C_p \times X_p = \sum_{p=K+1}^{D} C_p \begin{bmatrix} \chi_{p1} \\ \chi_{p2} \\ \vdots \\ \chi_{pD} \end{bmatrix} \tag{22}$$

The reference region characteristic calculating unit 144 calculates an average value $\Delta_d$ of the spectrum differences $\Delta_d(x,y)$ and uses it as the spectrum characteristic of the reference region. Data of the calculated spectrum characteristic (the average value $\Delta_d$ of the spectrum differences $\Delta_d(x,y)$) is stored in the storing unit 16.

As described above, in the first embodiment, the reference region characteristic calculating unit 144 performs the main component analysis on the reference region and calculates the spectrum characteristic (the average value $\Delta_d$ of the spectrum differences $\Delta_d(x,y)$) on the basis of the lower $(K+1)$th main component to the Dth main component in the obtained main components. By the operation, a spectrum component expressing a characteristic which cannot be expressed by the upper K components of the first to Kth main components which can substantially express the characteristic of the reference region can be extracted and used as the spectrum characteristic of the reference region.

The method of calculating the spectrum characteristic of the reference region is not limited to the above-described method. For example, on the basis of the spectrum (absorbance) obtained for the single stained-sample image of the process staining dye, the waveform characterizing the reference region is obtained by performing secondary differentiation on the absorbance. A characteristic wavelength may be detected on the basis of the obtained waveform. For example, a wavelength having a large waveform change may be detected as a characteristic wavelength. A secondary differentiation value detected may be used as a spectrum characteristic. When the absorbance at the wavelength i ($i=1, 2, \ldots, D$) is expressed as $a(i)$, a secondary differentiation value $Sd(i)$ ($i=1, 2, \ldots, D$) is expressed by the following Equation (23).

$$Sd(i)=a(i-1)+a(i+1)-2a(i) \quad (23)$$

The secondary differentiation value of absorbance emphasizes not only the characteristic waveform but also a noise component. Consequently, there is the possibility that artifact caused by the emphasized noise is erroneously detected as a characteristic point. To prevent the erroneous detection, moving average $Ma(i)$ of the secondary differentiation value may be calculated according to the following Equation (24). A characteristic waveform may be detected on the basis of the calculated moving average $Ma(i)$ to obtain the spectrum characteristic.

$$Ma(i) = \frac{1}{n}\sum_{i=0}^{n-1} Sd(n-i) \quad (24)$$

A spectrum may be measured in advance for each RGB value or brightness value. A spectrum according to the RGB value or brightness value of each of the pixels in the reference region may be selected from the measured spectra for the RGB values or brightness values, and used as a spectrum characteristic.

After the spectrum characteristic is calculated, as shown in FIG. 3, the characteristic difference calculating unit 145 sets pixels on the outside of the reference region of the process staining dye (pixels in pixel positions which to which the reference region label of the process staining dye is not given) as (x,y) and calculates a characteristic difference $\omega_d(x,y)$ for each of the pixels (step b13).

For example, first, spectra obtained for the pixels (x,y) out of the reference region are mapped to the main component space of the first to Dth main components obtained for the reference region. As a result, the 1 to D main component spectra of the pixels (x,y) out of the reference region are obtained. Like the procedure performed by the reference region characteristic calculating unit 144, the 1 to K main component spectra of the pixels (x,y) out of the reference region which can be reproduced by the upper K pieces of the first to K main components determined in the calculating process in step b11 as they can sufficiently express the characteristic of the reference region, from the obtained 1 to D main component spectra, and the obtained value is set as the spectrum difference $\delta_d(x,y)$.

The spectrum difference $\delta_d(x,y)$ corresponds to the K+1 to D main component spectra of the pixels (x,y) reproduced by the K+1 to D main components and is expressed by the following Equation (25).

$$\begin{aligned}\text{spectrum difference } \delta_d(x, y) &= \{1 \text{ to } D \text{ main component} \\ &\quad \text{spectra of pixels}(x, y)\} - \\ &\quad \{1 \text{ to } K \text{ main} \\ &\quad \text{component spectra}\} \\ &= \{K + 1 \text{ to } D \text{ main} \\ &\quad \text{component spectrum}\}\end{aligned} \quad (25)$$

Figure 7:
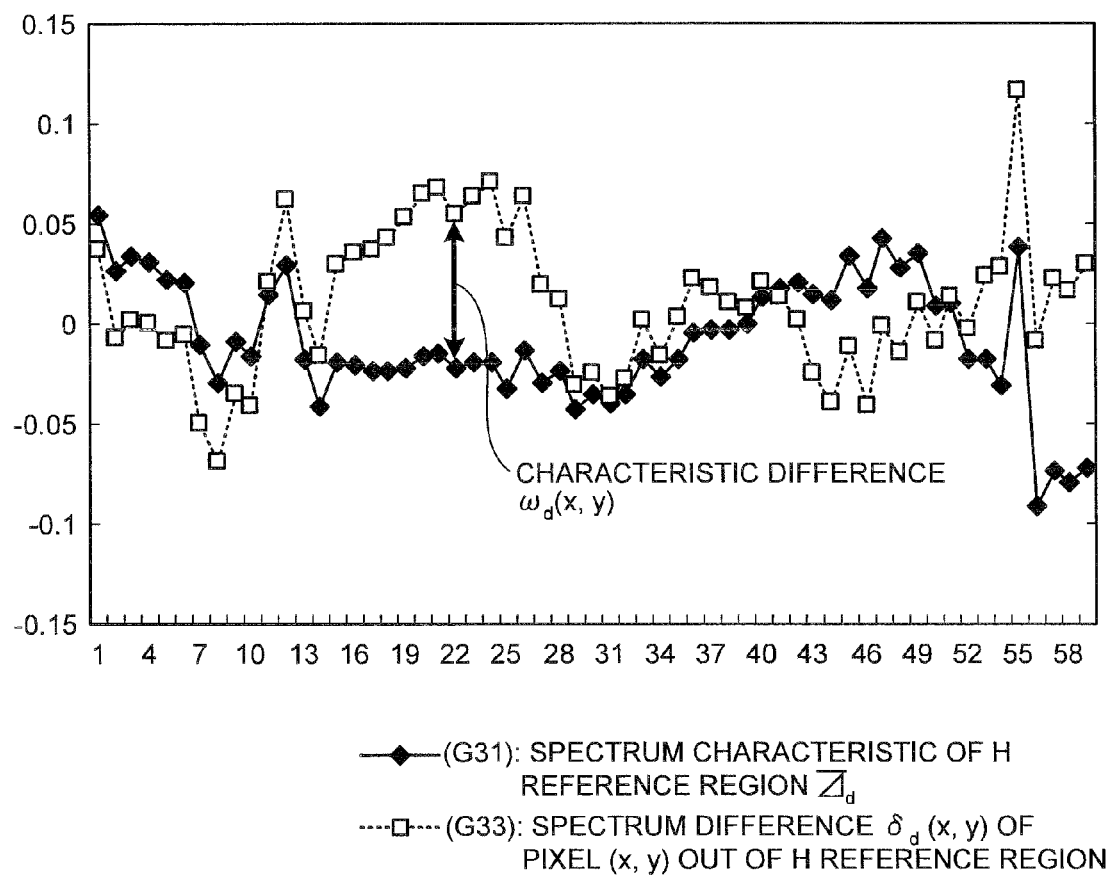
FIG. 7 is a diagram for explaining a procedure of calculating a characteristic difference.

It can be determined that the characteristic of the pixel (x,y) out of the reference region and having the smaller value of the spectrum difference $\delta_d(x,y)$ is more similar to the reference region. FIG. 7 is a diagram for explaining the procedure of calculating the characteristic difference $\omega_d(x,y)$. FIG. 7 has a horizontal axis expressing wavelengths and shows a graph G31 obtained by plotting the value of the spectrum characteristic (the average value $\Delta_d$ of the spectrum difference $\Delta_d(x,y)$) of the reference region calculated by the reference region characteristic calculating unit 144 in step b11 in FIG. 3, and a graph G33 obtained by plotting the value of the spectrum difference $\delta_d(x,y)$ calculated as described above on one pixel (x,y) out of the reference region. As shown in FIG. 7, the characteristic difference calculating unit 145 calculates the difference between $\Delta_d$ as the spectrum characteristic of the reference region and the spectrum difference $\delta_d(x,y)$ calculated on the pixel (x,y) out of the reference region and sets it as the characteristic difference $\omega_d(x,y)$.

Concretely, the characteristic difference calculating unit 145 calculates the difference between $\Delta_d$ as the spectrum characteristic of the reference region and the spectrum difference $\delta_d(x,y)$ calculated on each of the pixels (x,y) out of the reference region in accordance with the following Equation (26). The data of the calculated characteristic difference $\omega_d(x,y)$ of each of the pixels (x,y) out of the reference region is stored in the storing unit 16.

$$\omega_d(x,y)=\overline{\Delta}_d-\omega_d(x,y) \quad (26)$$

As described as the modification of the spectrum characteristic calculating method, in the case of detecting a characteristic waveform by performing two-dimensional differentiation on absorbance and setting the two-dimensional differentiation value as the spectrum characteristic, it is sufficient to calculate the characteristic difference only with respect to the detected wavelength.

After the characteristic difference $\omega_d(x,y)$ of each of the pixels (x,y) out of the reference region is calculated with respect to the process staining dye, the single stain classification processing unit 146 classifies the pixels in the single stained-sample image of the process staining dye to a predetermined number of hierarchical levels.

Concretely, first, as shown in FIG. 3, on the basis of the value of the characteristic difference $\omega_d(x,y)$ calculated in step b13 with respect to each of the pixels out of the reference region of the process staining dye, the single stain classification processing unit 146 detects, for example, a wavelength λ at which the absolute value of the value becomes the maximum as a characteristic wavelength $\lambda_{max}$ (step b15).

Subsequently, the single stain classification processing unit 146 performs a threshold process on the absolute value $|\omega(x,y)|_{max}$ of the characteristic difference at the characteristic wavelength $\lambda_{max}$ for each of the pixels out of the reference region. The single stain classification processing unit 146 excludes pixels having values larger than a predetermined threshold in the pixels out of the reference region from objects to be subjected to the hierarchical level classification to be performed in subsequent step b19 (step b17). The threshold used for the threshold process may be preset as a fixed value or variably set according to the user operation.

By performing the threshold process on the absolute value $|\omega(x,y)|_{max}$ of the characteristic difference at the characteristic wavelength $\lambda_{max}$, the pixels having the large characteristic difference are not classified to the hierarchical levels in the subsequent step b19 and are not referred to at the time of calculating the reference spectrum in step b23. Another configuration may be employed that a single stain RGB image of the process staining dye is properly displayed on the display unit 13 and pixels to be excluded from the objects to be classified may be selected in accordance with the user operation.

The single stain classification processing unit 146 classifies pixels to be classified in the single stain sample image of the process staining dye (pixels which are out of the reference region and are not excluded from the objects to be classified in step b17) to predetermined number j of hierarchical levels $step_i$ (i=1, 2, ..., j) (step b19). i denotes the hierarchy number. The value of j is, for example, a preset fixed value (j=2 in this example). The value of j may be variably set in accordance with the user operation.

As a concrete procedure, first, the characteristic difference amount value(i) (i=1, 2, ..., j) as a range condition at each hierarchical level $step_i$ is determined according to the following Equation (27).

$$(i-1) \times \frac{|\omega|_{max}}{j} < \text{value }(i) < i \times \frac{|\omega|_{max}}{j} \tag{27}$$

where $|\omega|_{max}$ denotes the maximum value in the absolute values $|\omega(x,y)|_{max}$ of the characteristic difference at the characteristic wavelength $\lambda_{max}$ for each of the pixels to be classified.

On the basis of the determined characteristic difference amount value(i) at each hierarchical level $step_i$, pixels to be classified are classified to the hierarchical levels. For example, pixels to be classified are sequentially set as objects to be processed, and the hierarchy number τ of the hierarchical level including the absolute value $|\omega(x,y)|_{max}$ of the characteristic difference at the characteristic wavelength $\lambda_{max}$ of the pixel to be processed is determined according to the following Equations (28) and (29). The characteristic difference amount value(i−1)$_{max}$ (i=1, 2, ..., j) is the upper limit value of the value(i−1), and the characteristic difference amount value(i)max (i=1, 2, ..., j) is the upper limit value of value(i).

$$\text{If value }(i-1)_{max} < \frac{\omega}{|(x,y)|_{max}} < \text{value }(i)_{max}, \tag{28}$$

then $\tau = i$ (i = 1, 2, ..., j)

where if $\frac{\omega}{|(x,y)|_{max}} < \text{value }(0)_{max}$, $\quad$ (31)

then $\tau = 0$

The pixel to be processed is classified to the hierarchical level of the determined hierarchical number τ. A hierarchical label $stepL_\tau$ indicative of the determined hierarchical level is given to the pixel to be processed.

After that, as shown in FIG. 3, the single stain classification processing unit 146 classifies a pixel in the reference region to a hierarchical level different from the hierarchical level $step_i$ to which the pixel is classified in step b19 and, finally, classifies the pixels in the single stained-sample image of the process staining dye to j+1 dye classes (step b21). To each of the pixel positions in the single stained-sample image of the process staining dye, the label $L_k$ (k=0, 1, ..., j) of the dye class to which the pixel belongs is given.

Figure 8:
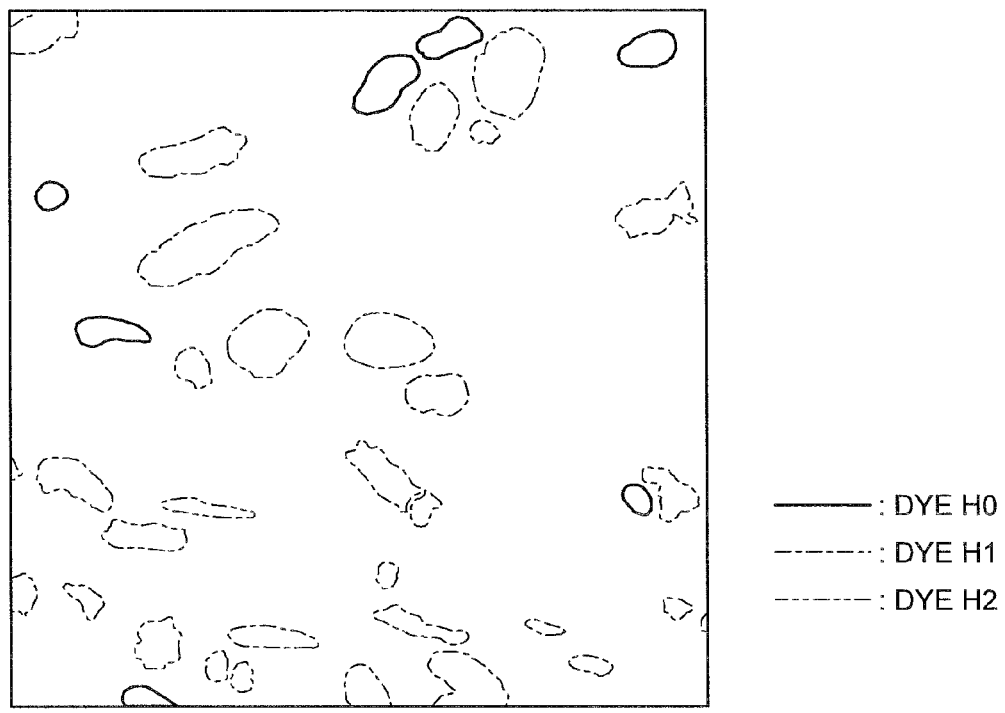
FIG. 8 is a diagram showing an example of a result of classification.

Since j is equal to 2 (j=2) in the embodiment as described above, the pixels in the single stained-sample image of the process staining dye are classified to three dye classes. Specifically, for example, class label $L_0$ is given to each of the pixels in the reference region, and class labels $L_1$ and $L_2$ are given to pixels belonging to two hierarchical levels classified in step b19 (pixels to which the hierarchical label $stepL_\tau$ is given). FIG. 8 is a diagram showing an example of a result of the classification. In FIG. 8, the dye class of a dye H0 to which the class label $L_0$ is given is expressed by solid line, the dye class of a dye H1 to which the class label $L_1$ is given is expressed by an alternate long and short dash line, and the dye class of a dye H2 to which the class label $L_2$ is given is expressed by an alternate long and two short dashes line. The dye class of the dye H0 is a dye class of the hierarchical level to which the pixels in the H reference region are classified, and the dye classes of the dyes H1 and H2 are dye classes at two hierarchical levels to which pixels out of the H reference region are classified. In such a manner, the pixels in the H single stained-sample image can be segmentalized to the three dye classes of the dyes H0, H1, and H2 in accordance with their spectra.

In the embodiment, according to Equations (27), (28), and (29), the pixels to be classified are classified to any of the hierarchical levels on the basis of the characteristic difference amount value(i) every determined hierarchical level $step_i$. The pixels in the reference regions are classified to the hierarchical level different from the hierarchical levels. The pixels in the single stained-sample image of the process staining dye are classified to the dye class every hierarchical level to which the pixels to be classified are classified and the dye class to which the pixels in the reference region are classified. The method is based the precondition that the reference region setting unit 143 sets the reference region of the staining dyes without excess or deficiency in step b3. However, in the case where the setting of the reference region is insufficient, a pixel to be set in the reference region is included in the pixels out of the reference region (pixels to be classified). Consequently, it is also possible to determine a pixel out of the reference region which cannot be set in the reference region in the process of step b3 by the reference region setting unit 143 (the user fails) and classify the determined pixel to the dye class to which the pixels in the reference region are classified.

In this case, for example, when the pixels are classified to three dye classes like the above-described example, j is set to 3 (j=3). Using the following Equation (30) in place of the above-described equation (27), the characteristic difference amount value(j−1) (i=1, 2, ..., j) as the range condition every hierarchical level $step_i$ is determined.

$$(i-1) \times \frac{|\omega|_{max}}{j} < \text{value } (i-1) < i \times \frac{|\omega|_{max}}{j} \quad (30)$$

On the basis of the characteristic difference amount value (i−1) every determined hierarchical level $step_i$, each of the pixels out of the reference region (pixels to be classified) are classified to the hierarchical levels in accordance with the following Equations (28) and (31).

$$\text{If value } (i-1)_{max} < \left|\omega_{(x,y)}\right|_{max} < \text{value } (i)_{max}, \quad (28)$$
$$\text{then } \tau = i \ (i=1, 2, \ldots, j)$$
$$\text{where when } \left|\omega_{(x,y)}\right|_{max} < \text{value } (0)_{max}, \tau = 0 \quad (31)$$

After that, in place of the process in step b31, the pixels in the reference region are classified to the hierarchical level $step_0$ as τ=0, and the pixels in the single stained-sample image of the process staining dye are classified to j dye classes every hierarchical level. In such a manner, the pixels classified to the hierarchical level $step_0$ can be corrected as pixels in the reference region. Therefore, a pixel to be set as a pixel in the reference region in pixels out of the reference region can be classified to the same dye class as that of a pixel set as a pixel in the reference region.

Prior to the classification of the pixels in the reference region to the hierarchical level $step_0$, the pixel positions out of the reference region classified to the hierarchical level $step_0$ may be displayed for confirmation on the display unit 13 and presented to the user. For example, a pixel position which is already set in the reference region and a pixel position classified to the hierarchical level $step_0$ may be displayed so as to be discriminated from each other on the single stain RGB image of the dye to be selected. In addition, an entry of determination operation by the user to whether the pixel classified to the hierarchical level $step_0$ is classified to the same dye class as that of the pixels in the reference region or not may be urged. By the operation, the user can finally determine whether the pixel out of the reference region classified to the hierarchical level $step_0$ is set as the pixel in the reference region or not. Thus, accuracy of a pixel in the reference region improves.

In addition, in step b13 in FIG. 3, the characteristic difference calculating unit 145 calculates the characteristic difference for pixels out of the reference region. In contrast, the characteristic difference may be calculated for all of pixels constructing a single stained-sample image of the process staining dye. In this case, in step b21, the single stain classification processing unit 146 may classify the pixels in the single stained-sample image of the process staining dye to predetermined number of dye classes on the basis of the calculated characteristic difference.

Another configuration may be also employed in which the result of classification shown in FIG. 8 is displayed on the display unit 13 and presented to the user. An operation of adding a new region to the region in each dye class, an operation of eliminating a part from a region of each dye class, an operation of integrating dye classes as one of a plurality of hierarchical levels, and the like, and a classification result may be corrected.

In this case, a wavelength at which the absolute value of the characteristic difference $\omega_d(x,y)$ at each wavelength the maximum is set as the characteristic wavelength $\lambda_{max}$. It is also possible to preset a predetermined wavelength or a wavelength band as a characteristic wavelength. At this time, the characteristic wavelength may be set every staining dye. For example, a characteristic wavelength or wavelength band may be set as a characteristic wavelength for each of the staining dyes. In this case, the influence of noise which tends to occur around a short wavelength or long wavelength can be suppressed.

Although the threshold process is performed on the absolute value $|\omega(x,y)|_{max}$ of the characteristic difference at the characteristic wavelength $\lambda_{max}$ in step b17 in FIG. 3, without performing the process, all of pixels out of the reference region may be set as objects to be classified, and classified to the hierarchical levels.

After the pixels in the single stained-sample image of the process staining dye are classified to a plurality of dye classes, subsequently, as shown in FIG. 3, the reference spectrum calculating unit 147 calculates a reference spectrum $k_i$ (i=1, 2, ..., m) every classified dye class (step b23). For example, the reference spectrum calculating unit 147 sequentially sets the dye classes as objects to be processed. The reference spectrum calculating unit 147 calculates an average value of spectra obtained with respect to the pixels belonging to the dye class to be processed and sets it as a reference spectrum $k_i$ for the dye class to be processed. The calculated reference spectrum $k_i$ for each dye class is associated with a class label $L_k$ (k=0, 1, ..., j) assigned to the class, and stored in the storing unit 16. The reference spectrum $k_i$ obtained for the dye class to which the pixels in the reference region are classified corresponds to a first dye spectral characteristic value. The reference spectrum $k_i$ obtained for the dye class to which the pixels out of the reference region are classified corresponds to a second dye spectral characteristic value. After that, the processes in the loop A on the process staining dye are finished.

Figure 9:
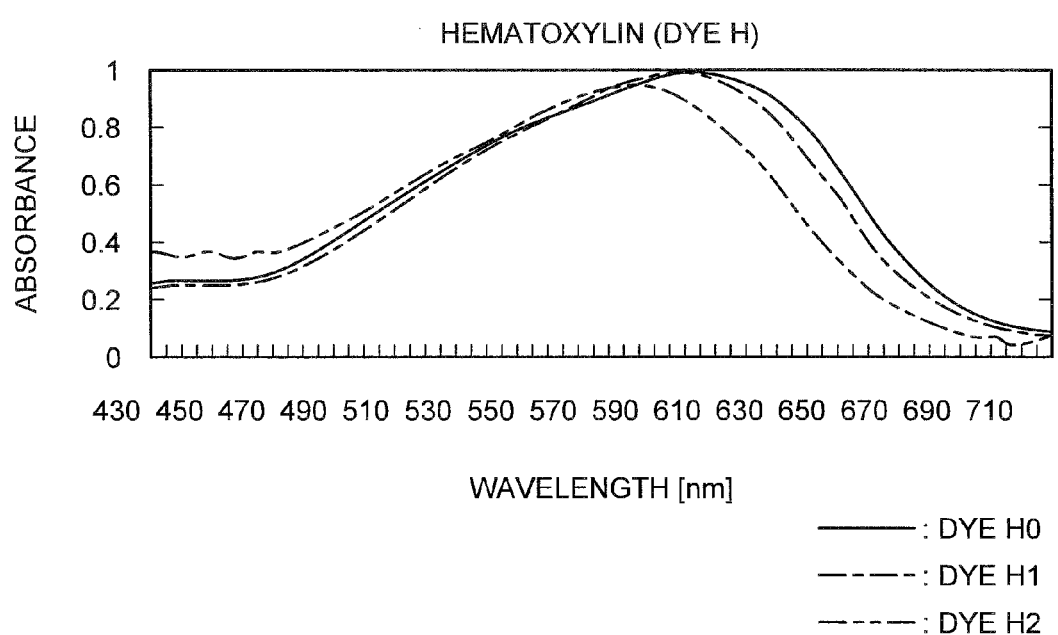
FIG. 9 is a diagram showing an example of reference spectra.

FIG. 9 is a diagram showing an example of the reference spectrum $k_i$. The diagram shows three reference spectra $k_i$ (i=0, 1, 2) obtained with respect to the dye H using the horizontal axis as wavelength and using the vertical axis as absorbance. More specifically, FIG. 9 shows three reference spectra $k_i$ obtained with respect to three dye classes; a dye class (dye H0) at the hierarchical level to which the pixels in an H reference region are classified, and dye classes (dyes H1 and H2) at two hierarchical levels to which the pixels out of the H reference region are classified. In this case, the dye H is characterized by the three reference spectra $k_i$ corresponding to the dye classes of the dyes H0, H1, and H2.

Finally, the reference spectrum obtaining unit 142 obtains a plurality of reference spectra $k_i$ in the dye classes as illustrated with respect to the dye H in FIG. 9 for each of the staining dyes. That is, the reference spectrum obtaining unit 142 performs the processes in the loop A while setting each of the staining dyes of the dyes H, E, and R as the process staining dye, after that, returns to step a7 in FIG. 2, and moves to step a9.

In step a9, the dye amount estimating unit 148 estimates the amount of each of the staining dyes of the observation stained sample on the dye class unit basis using the plurality of reference spectra $k_i$ in the dye classes obtained with respect to the staining dyes in the reference spectrum obtaining process in step a7 on the basis of the spectrum (absorbance a(x,λ)) obtained in each of the pixel positions in the observation stained-sample image.

The plurality of reference spectra $k_i$ obtained in the dye classes of the dye H will be described as $k_{Hi}$ (i=0, 1, ..., $m_H$), the plurality of reference spectra $k_i$ obtained in the dye classes of the dye E will be described as $k_{Ei}$ (i=0, 1, ..., $m_E$), and the plurality of reference spectra $k_i$ obtained in the dye classes of the dye R will be described as $k_{Ri}$ (i=0, 1, ..., $m_R$).

As described by Equation (2) in the background art, the Lambert-Beer law is satisfied with respect to the spectral transmittance t(x,λ). The spectral transmittance t(x,λ) can be converted to absorbance a(x,λ) by using Equation (6). The dye amount estimating unit 148 estimates the dye amount by applying the equations. At this time, the dye amount estimating unit 148 estimates the amount of each of dyes H0 to $Hm_H$, dyes E0 to $Em_E$, and dyes R0 to $Rm_R$ each indicative of the dye class by using $m_H$ pieces of reference spectra $k_{Hi}$ in the dye classes of the dye H, $m_E$ pieces of reference spectra $k_{Ei}$ in the dye classes of the dye $E_f$ and $m_R$ pieces of reference spectra $k_{Ri}$ in the dye classes of the dye R. That is, according to the Lambert-Beer law, the absorbance a(x,λ) in each of the sample points on the observation stained sample corresponding to the pixels (x,y) in the observation stained-sample image is expressed by the following Equation (32).

$$a(x, \lambda) = k_{H0}(\lambda)d_{H0}(x) + k_{H1}(\lambda)d_{H1}(x) + \ldots + k_{Hm_H}(\lambda)d_{Hm_H}(x) + \\ k_{E0}(\lambda)d_{E0}(x) + k_{E1}(\lambda)d_{E1}(x) + \ldots + k_{Em_R}(\lambda)d_{Em_R}(x) + \\ k_{R0}(\lambda)d_{R0}(x) + k_{R1}(\lambda)d_{R1}(x) + \ldots + k_{Rm_R}(\lambda)d_{Rm_R}(x)$$

(32)

The dye amounts in the dye classes (the dyes H0 to $Hm_H$, the dyes E0 to $Em_E$, and the dyes R0 to $Rm_R$) in each of the sample points on the observation stained sample corresponding to each pixel (x,y) can be estimated (calculated) by, for example, applying the method described by Equation (3) in the background art, and performing the multiple regression analysis. Data of the dye amount of each of the staining dyes (the dyes H, E, and R) estimated on the dye class unit basis is stored in the storing unit 16.

Figure 10:
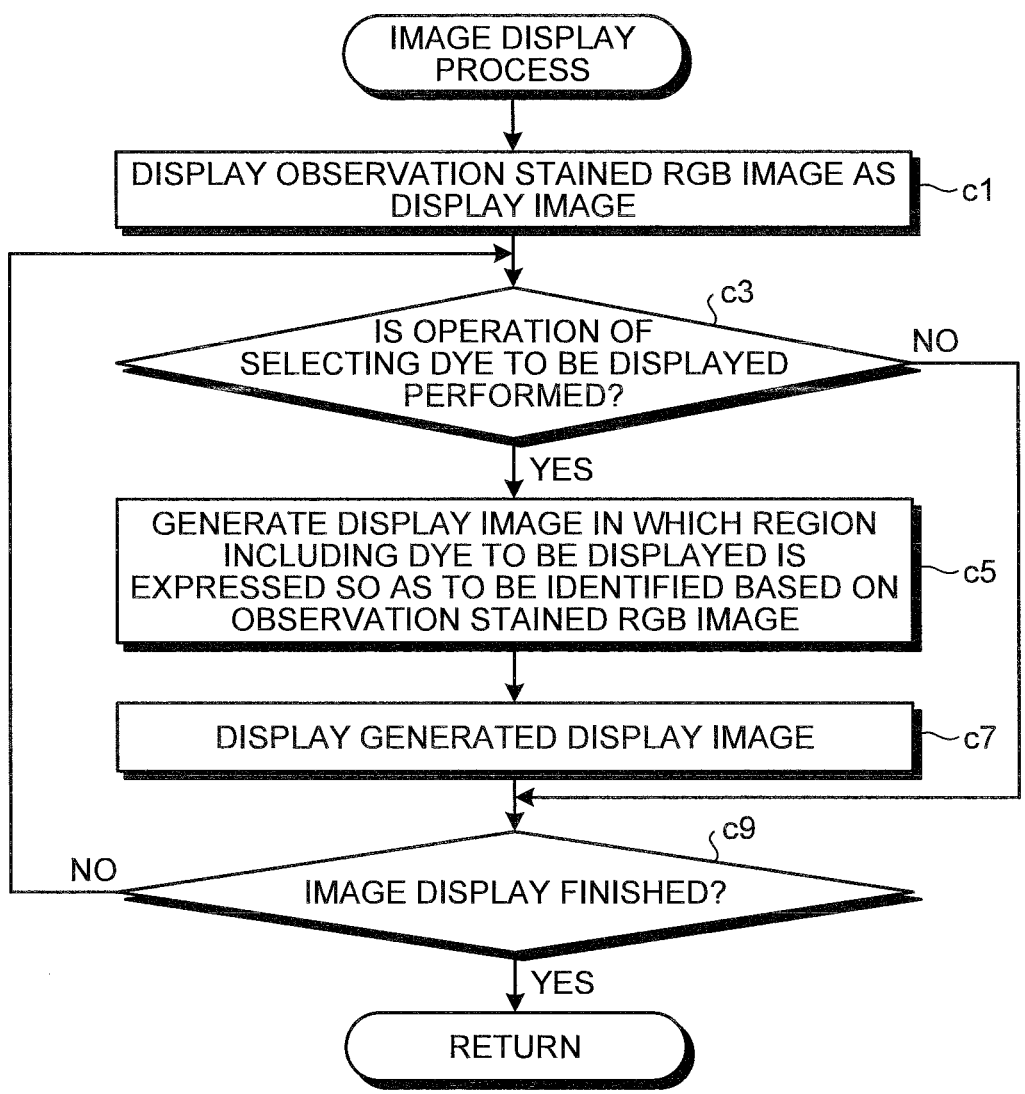
FIG. 10 is a flowchart showing a detailed procedure of image display process in the first embodiment.

After estimating the dye amounts as described above, as shown in FIG. 2, the apparatus moves to the image display process (step a11). In the image display process, an image for displaying the observation stained sample (display image) is generated on the basis of the dye amount estimated in step a9, and the process displayed on the display unit 13 is performed. FIG. 10 is a flowchart showing a detailed procedure of the image display process in the first embodiment.

In the image display process, first, the image display processing unit 175 performs a process of displaying an RGB image of the observation stained sample (observation stained RGB image) synthesized in step a5 in FIG. 2 as a display image on the display unit 13 (step c1).

Subsequently, the dye selection input requesting unit 173 performs a process of displaying the display unit 13 of notification of the request to select and input a dye to be displayed. While an operation of selecting a dye to be displayed is not entered in response to the notification of the selection input request and a dye to be displayed is not selected (No in step c3), the apparatus moves to step c9.

On the other hand, in the case where the operation of selecting a dye to be displayed is entered by the user (Yes in step c3), on the basis of the observation stained RGB image, the display image generating unit 149 generates a display image in which a region (a pixel position including the dye to be displayed) on an observation stained sample which is stained with the dye to be displayed is shown so as to be discriminated (step c5). For example, the display image generating unit 149 selects the position of a pixel including the dye to be displayed (the dye amount of the dye to be displayed is not "0") on the basis of the dye amount in each of the sample points on the observation stained sample which is estimated pixel by pixel in the observation stained-sample image in step a9 in FIG. 2, and sets it as a staining region of a dye to be displayed. The dye to be displayed can be selected on the dye class unit basis. In the case where the dye class (dye class to be displayed) is selected, the display image generating unit 149 selects the position of a pixel including the dye amount in the selected dye class (the dye amount in the dye class is not "0") and sets a staining region of a dye to be displayed. The display image generating unit 149 generates a display image in which pixels in the staining region of a dye to be displayed can be discriminated from the other pixels on the basis of the observation stained RGB image.

Subsequently, the image display processing unit 175 performs a process of displaying the display image generated in step c5 on the display unit 13 (step c7) and, after that, moves to step c9. The display image generated in step c5 may be displayed in place of a display image already displayed, or in parallel with the display image already displayed.

In step c9, whether the image display is finished or not is determined. While it is not finished (No in step c9), the image display processing unit 175 returns to step c3 and accepts the operation of selecting a dye to be displayed. For example, when an operation of finishing the image display is entered by the user, the unit determines that the image display is finished (Yes in step c9). In this case, the unit returns to step a11 in FIG. 2 and, after that, finishes the process.

Figure 11:
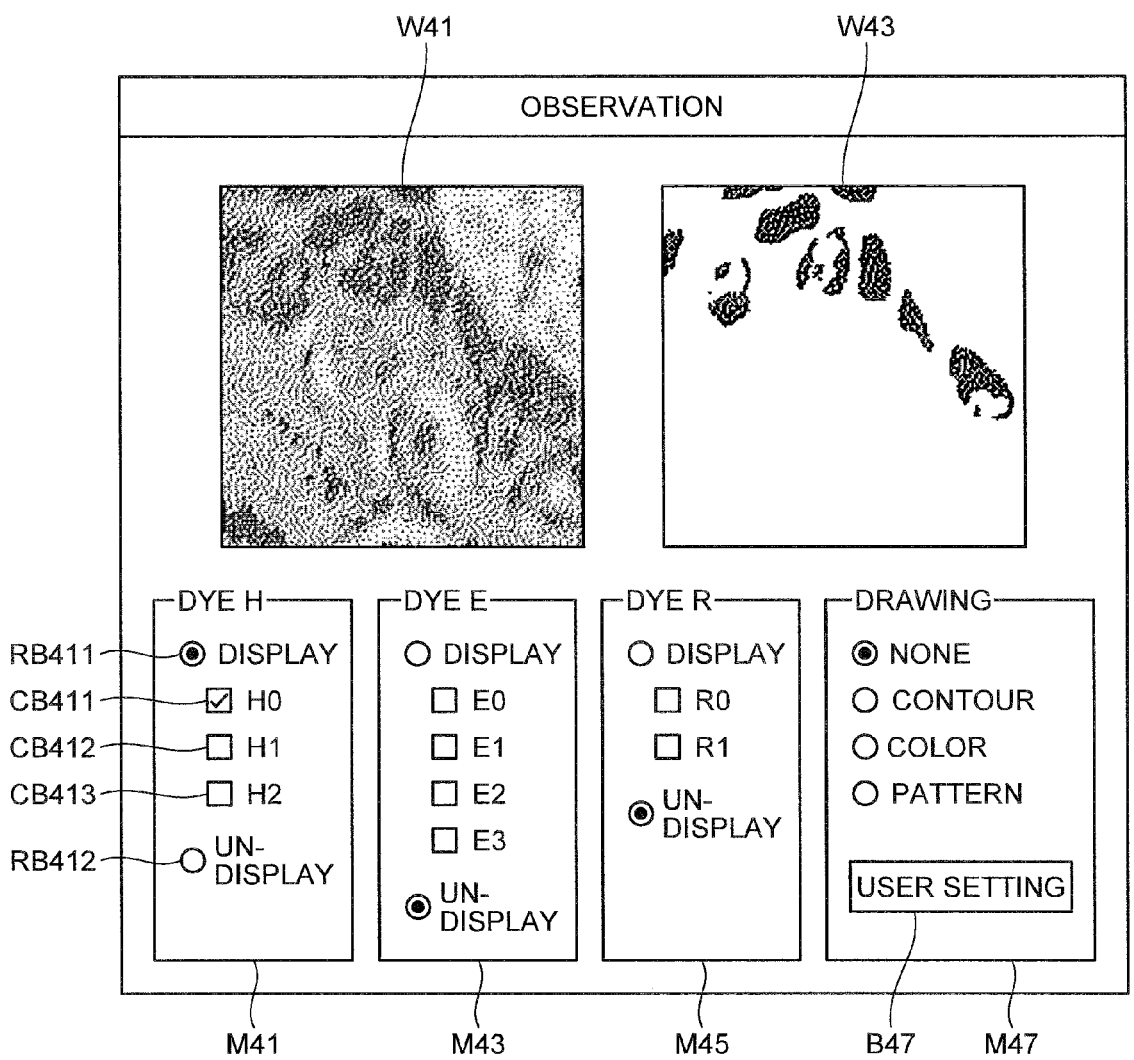
FIG. 11 is a diagram showing an example of an observation screen in the first embodiment.

An operation example when the user observes a display image will be described. FIG. 11 is a diagram showing an example of an observation screen of a display image in the first embodiment. The observation screen shown in FIG. 11 has two image display parts W41 and W43. The observation screen also has a dye H selection menu M41, a dye E selection menu M43, and a dye R selection menu M45 for selecting a dye to be displayed, and the dyes to be displayed can be selected on the dye class unit basis for each staining dye. That is, in the dye H selection menu M41, radio buttons RB411 and RB412 by which the dye H is displayed or not can be selected are disposed. Further, in the dye H selection menu M41, check boxes CB411 to CB413 for selecting the dyes H0, H1, and H2 as dyes to be displayed in the case of displaying are disposed. In FIG. 11, display of the dye H is selected by the radio button RB411, and the check button CB411 is checked to select the dye H0 as the dye class as the dye to be displayed. In the case of selecting the dye H as a dye to be displayed, it is sufficient to check all of the check boxes CB411 to 413. The dye E selection menu M43 and the dye R selection menu M45 are similarly configured, and each of the staining dyes can be selected in the dye class unit basis.

In the image display part W41 on the left side in FIG. 11, for example, an observation stained RGB image is displayed. On the other hand, in the image display part W43 on the right side, a display target dye identifying image for identifying regions stained with a dye to be displayed is displayed. The display target dye identifying image is an example of a display image generated by the process in step c5 in FIG. 10 and is generated, for example, as an image displaying a region stained with a dye to be displayed and displaying nothing in the other region. In the case where the dye class is selected as the dye to be displayed, an image that does not display dye classes other than the selected dye class (does not display a region which does not include the dye amount on the selected dye class) is generated. In FIG. 11, the display target dye identifying image is displayed, which displays the display target dye staining region in which the dye H0 in the observation stained RGB image is set, and which does not display the other pixels. For example, as the internal process in this case, the display image generating unit 149 sets a display target dye region on the basis of the dyes to be displayed selected in the dye H selection menu M41, the dye R selection menu M43, and the dye R selection menu M45, and replaces the pixel value out of the set display target dye staining region to predetermined color (for example, white), thereby generating an image for identifying a dye to be displayed.

Further, the observation screen also has a drawing menu M47 for designating a drawing mode of the image for identifying a dye to be displayed, which is to be displayed in the image display part W43. For example, in the example of FIG. 11, radio buttons by which any one of "none", "contour", "color", and "pattern" can be alternatively selected as a drawing mode are disposed. When "none" is selected on the drawing menu M47 as shown in FIG. 11, the image for identifying a dye to be displayed is displayed as it is in the display target dye display part W43. When "contour" is selected, the display target dye staining regions for the dyes to be displayed are surrounded by a contour line and displayed so as to be identified. When "color" is selected, in the display target dye identifying image, the display target dye staining regions for the dyes to be displayed are replaced with a predetermined drawing color and displayed so as to be identified. The drawing color is preset for each of the dyes to be displayed. When "pattern" is selected, in the display target dye identifying image, the display target dye staining region for each dye to be displayed is identified and displayed by a predetermined filled pattern. The filled pattern is preset for each of the dyes to be displayed. For example, in the case where two or more dyes to be displayed are selected by the selection menus M41, M43, and M45, by selecting "color" and "pattern" in the drawing menu M47, the display target dye staining region can be displayed so as to be identified for each of the dyes to be displayed. In the drawing menu M47, a user setting button B47 is disposed. By a click, a color and a filled pattern to be assigned to the dye to be displayed, edition on an identification display item presented in the drawing menu M47, and the like can be performed.

Figure 12:
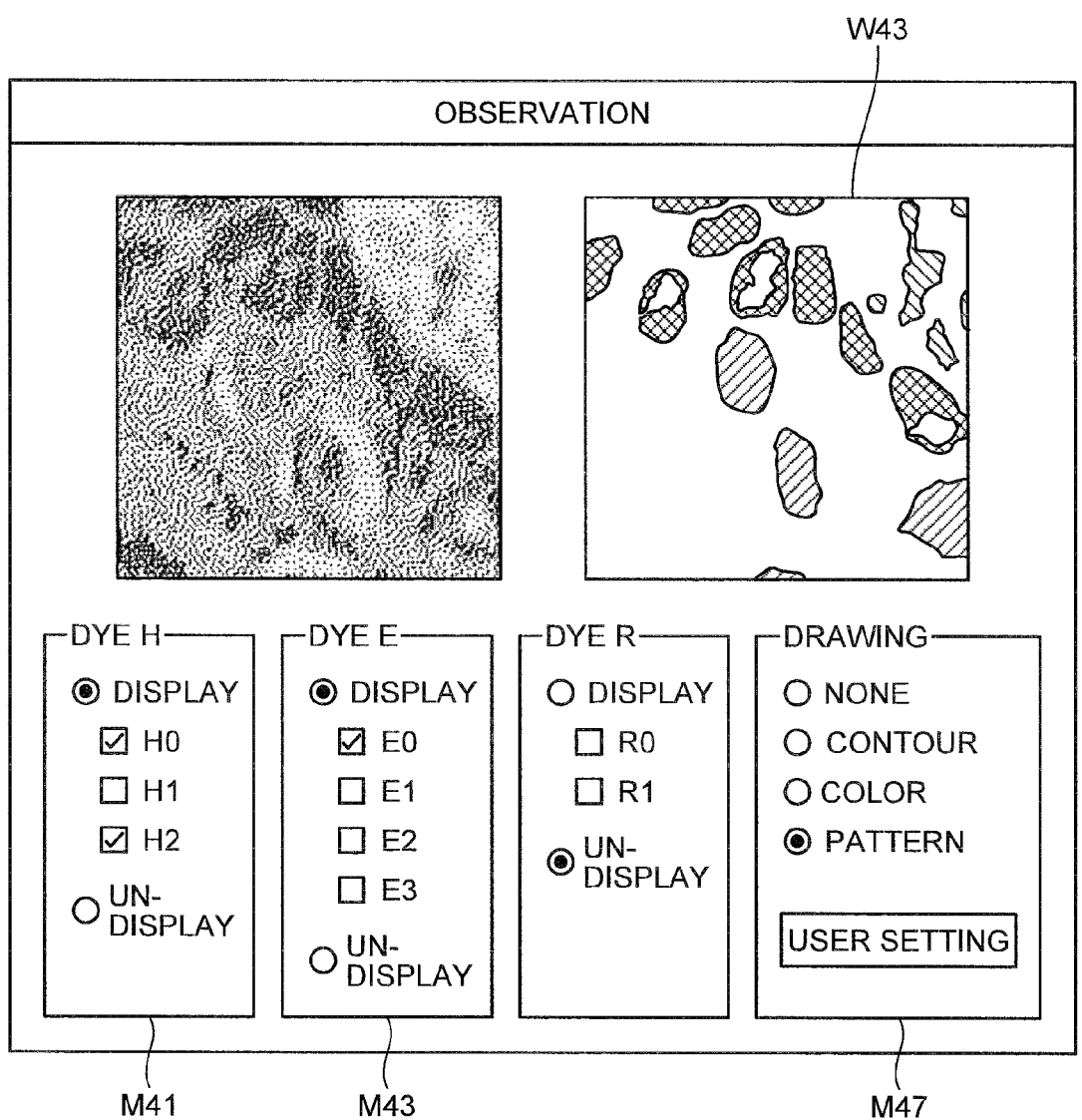
FIG. 12 is a diagram showing another example of the observation screen in the first embodiment.

FIG. 12 is a diagram showing an example of the observation screen in the case where "pattern" is selected in the drawing menu M47. In the example of FIG. 12, an image for identifying dyes to be displayed is displayed in the image display part W43. In the image, the display target dye staining regions of the dyes H0, H2, and E0 selected as dyes to be displayed in the dye H selection menu M41 and the dye E selection menu M43 are expressed by filled patterns assigned to the dyes H0, H2, and E0 in the image display part W43.

The identification display method is not limited to the above. For example, the hue in the position of a dye to be displayed can be changed step by step in accordance with the value of the dye amount.

As described above, according to the first embodiment, a spectrum in each pixel position is obtained on the basis of the H single stained-sample image. On the basis of the obtained spectrum, the dye H is classified to a plurality of dye classes, and a plurality of stepwise reference spectra can be obtained every dye class. At this time, pixels in the H single stained-sample image can be classified on the basis of the characteristic difference from the spectrum obtained for the pixels in the H reference region. Therefore, the pixels in the H single stained-sample image can be properly classified, and a plurality of reference spectra of the dye H can be obtained.

Similarly, a spectrum in each pixel position is obtained on the basis of the E single stained-sample image. On the basis of the obtained spectrum, the dye E is classified to a plurality of dye classes, and a plurality of stepwise reference spectra can be obtained every dye class. At this time, pixels in the E single stained-sample image can be classified on the basis of the characteristic difference from the spectrum obtained for the pixels in the E reference region. Therefore, the pixels in the E single stained-sample image can be properly classified, and a plurality of reference spectra of the dye E can be obtained.

A spectrum in each pixel position is obtained on the basis of the R single stained-sample image. On the basis of the obtained spectrum, the dye R is classified to a plurality of dye classes, and a plurality of stepwise reference spectra can be obtained every dye class. At this time, pixels in the R single stained-sample image can be classified on the basis of the characteristic difference from the spectrum obtained for the pixels in the R reference region. Therefore, the pixels in the R single stained-sample image can be properly classified, and a plurality of reference spectra of the dye R can be obtained.

On the basis of the spectrum obtained for each of the pixels of the observation stained-sample image, using the obtained plurality of stepwise reference spectra for each dye class, the amount of a staining dye in a sample point on an observation stained sample can be estimated every dye class.

With the method, the reference spectrum of each staining dye used for the dye amount estimation can be segmentalized. Therefore, even in the case where the dye spectral characteristic value of the staining dye with which the staining sample to be observed is actually stained fluctuates, the dye amount can be estimated with high precision.

In addition, unlike the case of preliminarily obtaining the reference spectrum by using a measuring device or the like, the user does not have to select a pixel position in which the reference spectrum on the single stained sample is obtained. With the method, the labor for the user can be eliminated, and a situation does not occur such that the reference spectrum of the staining dye varies among users who select pixel positions in which the reference spectrum of a staining dye is set, and the reliability deteriorates.

According to a user operation, a dye to be displayed can be selected on the dye class unit basis. On the basis of the amount of a staining dye estimated in the dye class unit, the pixel position in an observation stained-sample image including the selected dye to be selected (in the case of selecting a dye class as a dye to be displayed, including a dye amount with respect to the dye class) is selected. A display image in which regions on the observation stained sample stained with the dye to be displayed (the pixel position including the dye to be displayed) can be generated. Therefore, an image expressing the inside of an observation stained sample with improved visibility can be presented to the user. Thus, the observation efficiency of the user can be improved. For the user, by selecting a desired staining dye to be observed on the dye class unit basis, the regions of desired staining dyes in the observation stained sample can be observed individually or in combination on the dye class unit basis with high visibility.

Figure 13:
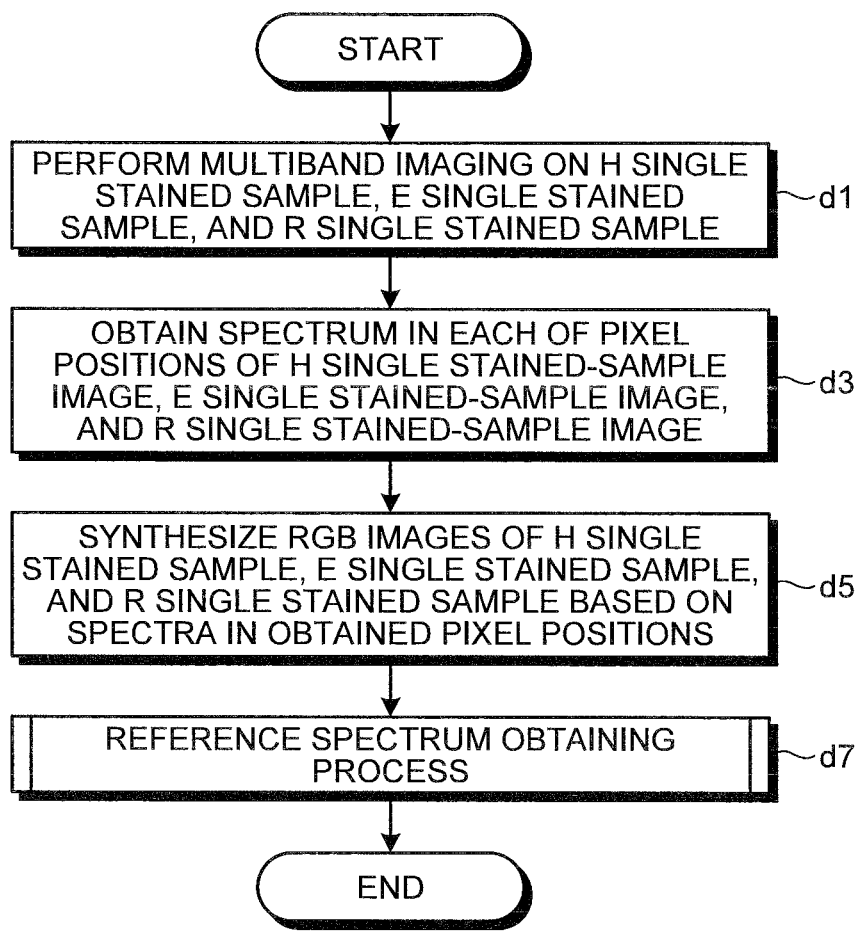
FIG. 13 is a flowchart showing a procedure performed to obtain a reference spectrum in a modification.
Figure 14:
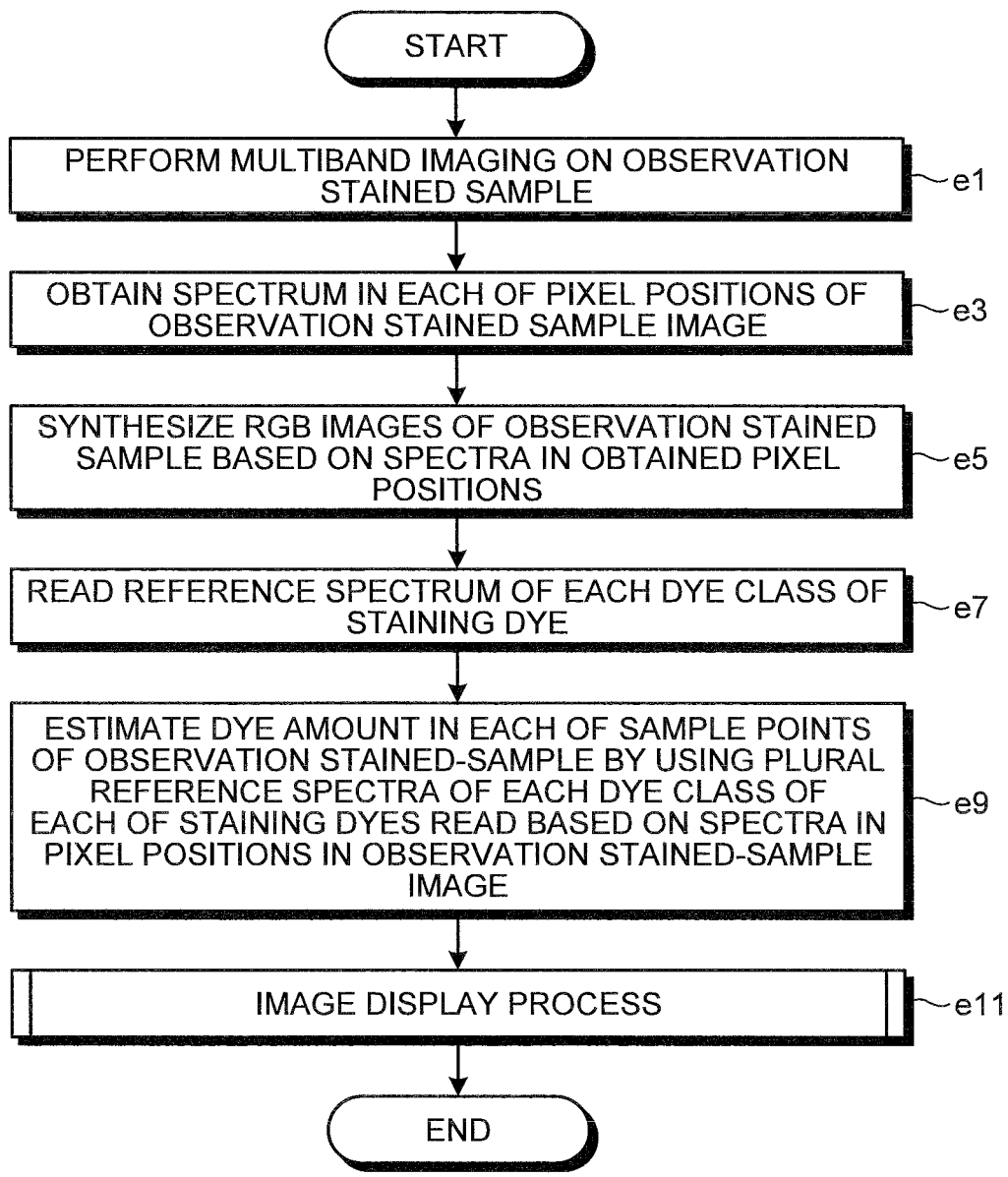
FIG. 14 is a flowchart showing a procedure performed to estimate a dye amount of an observation stained-sample in the modification.

In the foregoing first embodiment, the reference spectrum obtaining process is performed each time the dye amount in the observation stained sample is estimated. The reference spectrum obtaining process may be performed in advance at a desired obtaining timing without performing the process each time the dye amount is estimated. At the time of estimating a dye amount of the observation stained sample, a plurality of reference spectra in different staining states which are obtained in advance by preliminarily performing the reference spectrum obtaining process may be read and used. FIG. 13 is a flowchart showing the procedure performed at the time of obtaining the reference spectrum in the modification. FIG. 14 is a flowchart showing the procedure performed at the time of estimating a dye amount of the observation stained sample in the modification.

As shown in FIG. 13, in the process at the time of obtaining the reference spectrum which is performed in advance in the modification, first, the control unit 17 controls the operation of the stained-sample image capturing unit 11 to sequentially perform multiband imaging on an H single stained sample, an E single stained sample, and an R single stained sample (step d1). Subsequently, the spectrum obtaining unit 141 obtains the spectrum in each of the pixel positions in each of an H single stained-sample image, an E single stained-sample image, and an R single stained-sample image (step d3). After that, on the basis of the spectra in the pixel positions in each of the obtained single stained-sample images, the spectrum obtaining unit 141 combines RBG images of each of the H single stained-sample image, E single stained-sample image, and R single stained-sample image (step d5).

The reference spectrum obtaining process described with reference to FIG. 3 in the foregoing first embodiment is performed to obtain a plurality of reference spectra on the dye class unit basis of each of the stained dyes (dyes H, E, and R) with which the observation stained sample is stained (step d7). The reference spectra on the dye class unit basis of the obtained staining dyes are stored in the storing unit 16. The reference spectra are read and used at the time of estimating a dye amount.

Specifically, as shown in FIG. 14, in the process at the time of estimating the dye amount in the modification, first, the control unit 17 controls the operation of the stained-sample image capturing unit 11 to sequentially perform multiband imaging on an observation stained sample (step e1). Subsequently, the spectrum obtaining unit 141 obtains the spectrum in each of the pixel positions in the observation stained-sample image (step e3). After that, on the basis of the spectra in the pixel positions in the obtained observation stained-sample image, the spectrum obtaining unit 141 combines RBG images of the observation stained sample (step e5).

Subsequently, the dye amount estimating unit 148 reads the reference spectrum in each of the dye classes of each staining dye obtained in advance and stored in the storing unit 16 (step e7). The dye amount estimating unit 148 estimates the dye amount of each of the staining dyes in the observation stained sample on the dye class unit basis by using a plurality of reference spectra in the dye class units of the read staining dyes on the basis of the spectrum obtained in each of the pixel positions in the observation stained-sample image (step e9). After that, the image display process described with reference to FIG. 10 in the foregoing first embodiment is performed (step e11).

By learning staining dyes and their content distributions in advance for each tissue included in a stained sample, the tissues in the observation stained sample can be determined by a support vector machine (SVM) and the like. Concretely, for each tissue such as a cell cytoplasm, a fibrous region, a nucleus, and a cell cytoplasm around a nucleus, a staining dye with which each of the tissues is stained and its content ratio are learned in advance and stored as teacher data.

For example, staining dyes for a cell cytoplasm are dyes H and E. In the case of learning the content ratio of each of the dyes H and E, the kinds of the staining dyes and the content ratios are stored as known data. For example, the dyes H and E with which a cell cytoplasm is stained are described as a dye H_b, and a dye E_a, respectively. Similarly, results of learning also on a fibrous region, a nucleus, and a cell cytoplasm around a nucleus are also stored as known data. For example, the dyes H and E with which a fibrous region is stained are written as dye H_c and dye E_a, respectively, the dyes H and E with which a nucleus is stained are written as dye H_a and E_b, respectively, and the dyes H and E with which a cell cytoplasm around a nucleus are stained are written as dyes H_b, and E_a, respectively. The spectral characteristic values (spectra) of the dyes H_b, H_c, E_a, and E_b are, for example, preliminarily measured.

In the case where the dyes H_a, H_b, H_c, E_a, and E_b correspond to any of dye classes classified by applying the first embodiment, corresponding relations between the dyes and the corresponding dye classes are set in advance. On the other hand, in the case where the dyes H_a, H_b, H_c, E_a, and E_b do not correspond to any of the dye classes, for example, by selecting a dye class having the smallest least square error, each of the dyes H_a, H_b, H_c, E_a, and E_b is associated with any of the dye classes of the corresponding staining dye. For example, the dyes H_b and E_a of a cell cytoplasm are associated with the dye classes of the dyes H1 and E0, respectively. Similarly, the dyes H_c and E_a of a fibrous region are associated with the dye H2 and E0, respectively. The dyes H_a and E_b of a nucleus are associated with the dyes H0 and E1, respectively. The dyes H_b and E_a of a cell cytoplasm around a nucleus are associated with the dyes H3 and E0, respectively. Although the association is just an example, by setting the corresponding relations in such a manner, a tissue to which a pixel belongs can be determined from a dye amount in each of the die classes in each of the pixel positions obtained as a result of actually performing the dye amount estimation and a content ratio. In this case, on the basis of the tissue determined pixel by pixel, an image expressing a region of each tissue in the observation stained sample may be generated and displayed on the display unit 13. It is also possible to identify the region of each tissue on the observation stained RGB image.

Figure 15:
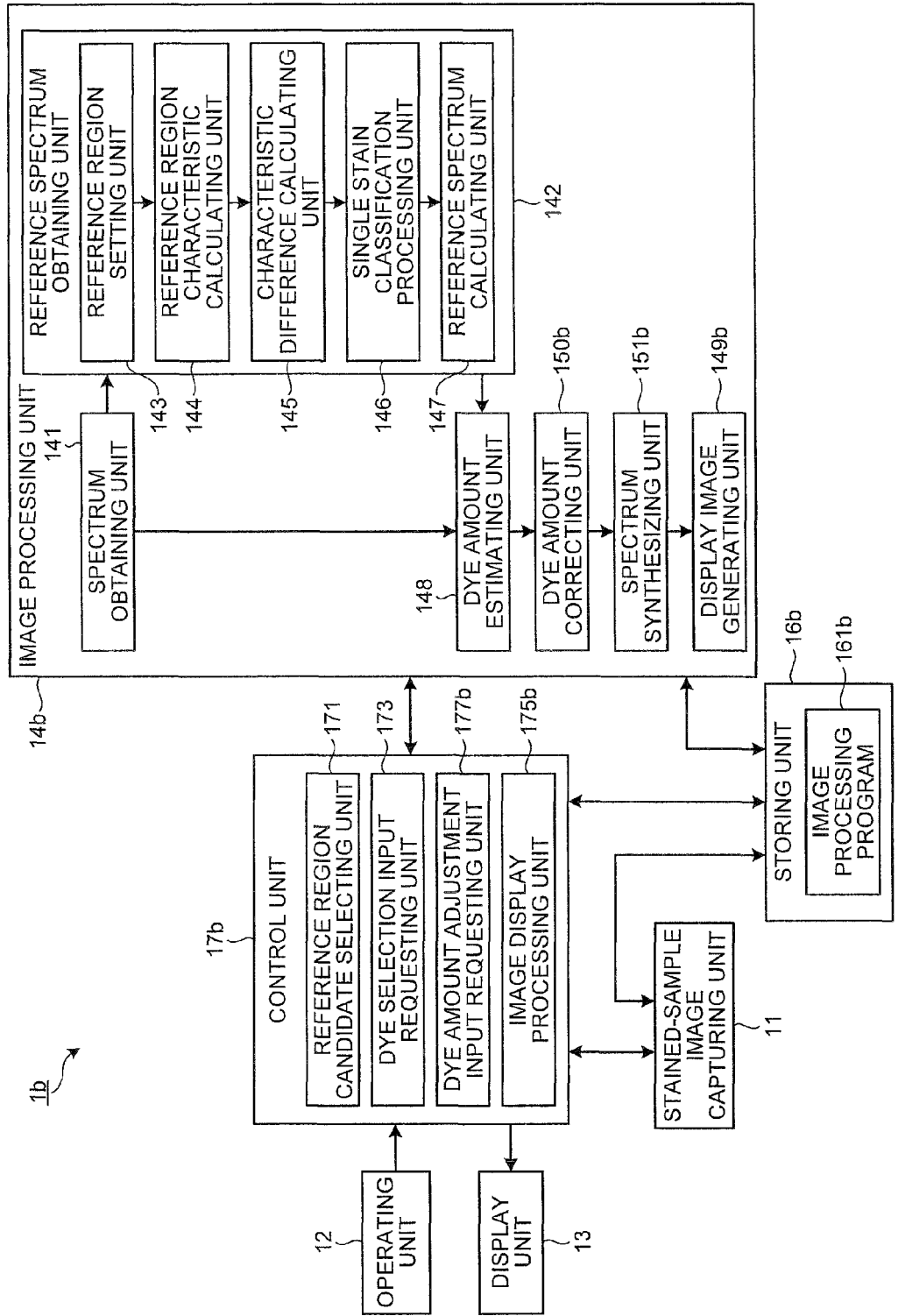
FIG. 15 is a block diagram showing a functional configuration of an image processing apparatus in a second embodiment.

FIG. 15 is a block diagram showing a functional configuration of an image processing apparatus 1b in a second embodiment. In FIG. 15, the same reference numerals are designated to components similar to those of the image processing apparatus 1 described in the first embodiment.

As shown in FIG. 15, the image processing apparatus 1b of the second embodiment has the stained-sample image capturing unit 11, the operating unit 12, the display unit 13, an image processing unit 14b, a storing unit 16b, and a control unit 17b.

The image processing unit 14b includes the spectrum obtaining unit 141, the reference spectrum obtaining unit 142, the dye amount estimating unit 148, a dye amount correcting unit 150b, a spectrum synthesizing unit 151b as a spectral characteristic synthesizing unit, and a display image generating unit 149b. The dye amount correcting unit 150b corrects the dye amount of each of the dyes H, E, and R estimated by the dye amount estimating unit 148 on the die class unit basis in accordance with a user operation entered from the operating unit 12 in response to an adjustment input request by a dye amount adjustment input requesting unit 177b. The spectrum synthesizing unit 151b calculates the spectral transmittance $t(x,\lambda)$ on the basis of the dye amounts in the dye classes of the dyes H, E, and R corrected by the dye amount correcting unit 150b.

In the storing unit 16b, an image processing program 161b for estimating and correcting a dye amount in each of the sample positions in the observation stained sample is stored.

The control unit 17b includes the reference region candidate selecting unit 171, the dye selection input requesting unit 173 as a dye class selection requesting unit, a dye amount adjustment input requesting unit 177b, and an image display processing unit 175b as a display processing unit. The dye amount adjustment input requesting unit 177b performs a process of requesting for a dye amount adjustment input, and receives an operation of adjusting the dye amount by the user via the operating unit 12.

Figure 16:
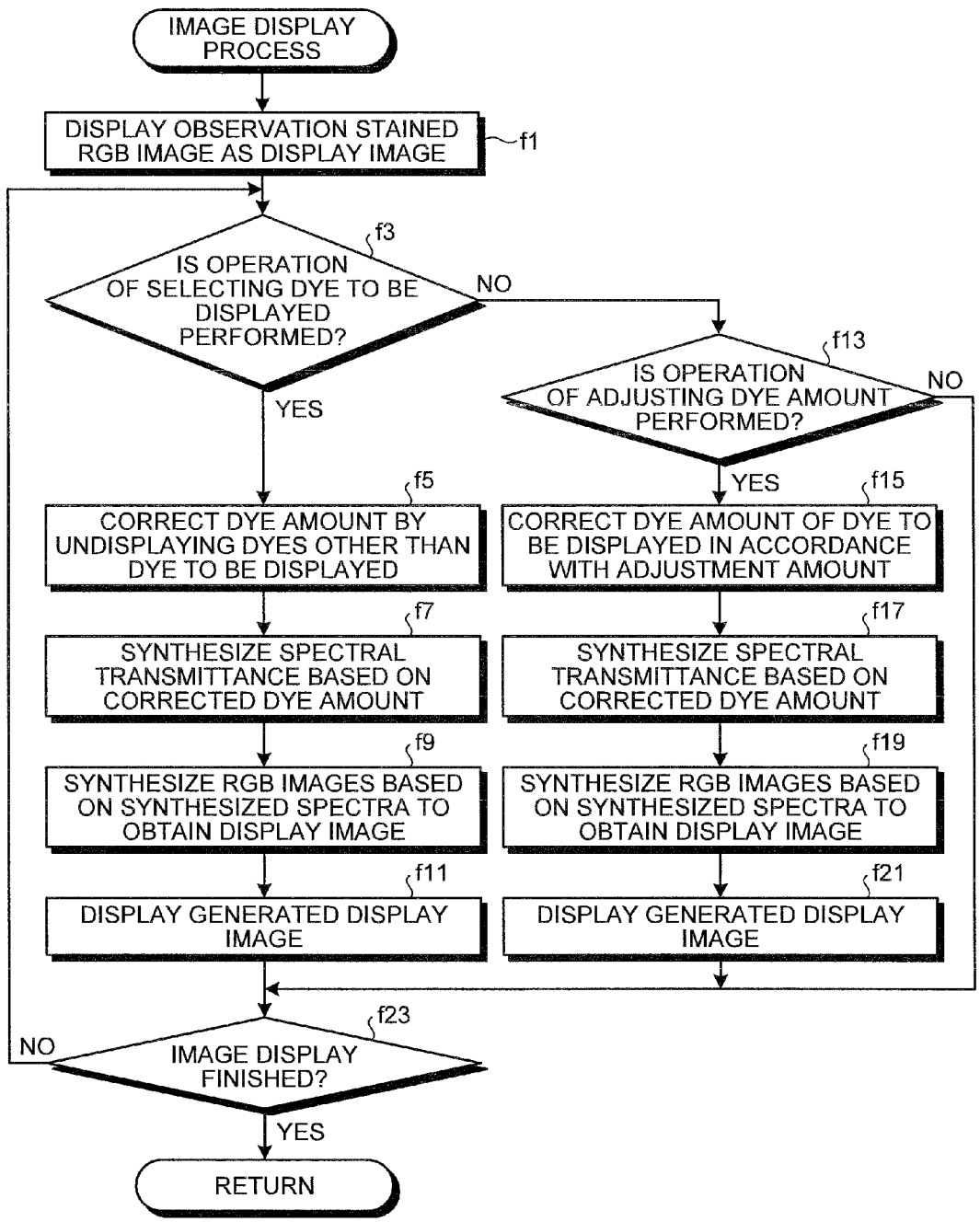
FIG. 16 is a flowchart showing a detailed procedure of image display process in the second embodiment.

The image processing apparatus 1b of the second embodiment performs an image display process shown in FIG. 16 in place of the image display process in step a11 in the procedure shown in FIG. 2 in the first embodiment. The processes performed by the image processing apparatus 1b are realized when the components of the image processing apparatus 1b operate in accordance with the image processing program 161b stored in the storing unit 16b.

In the image display process, first, as shown in FIG. 16, an image display processing unit 175a performs a process of displaying the observation stained RGB image synthesized in step a5 in FIG. 2 described in the first embodiment, as a display image on the display unit 13 (step f1).

Subsequently, the dye selection input requesting unit 173 performs a process of displaying a notification of a selection input request for a dye to be displayed, on the display unit 13. In the case where an operation of selecting a dye to be displayed is input in response to the notification of the selection input request (Yes in step f3), the dye amount correcting unit 150b corrects a dye amount by undisplaying dyes other than the dye to be displayed (step f5). For example, a correction is made by replacing, with "0", the dye amounts of all of the dyes other than the dye to be displayed, out of the dye amounts estimated pixel by pixel in the observation stained sample image in step a9 in FIG. 2 described in the first embodiment. The dye to be displayed can be selected on the dye class unit basis like in the first embodiment, and the dye amount is corrected on the dye class unit basis.

Subsequently, the spectrum synthesizing unit 151b obtains a spectral transmittance t(x,λ) on the basis of the dye amount in each of the dye classes of the dyes H, E, and R corrected (step f7). For example, according to the following equation (33), the spectrum synthesizing unit 151b newly calculates a spectral transmittance t(x,λ) in a pixel position (x) by using a plurality of reference spectra in the dye classes obtained by the reference spectrum obtaining process in FIG. 3 described in the first embodiment.

$$-\log t(x, \lambda) = k_{H0}(\lambda)d_{H0}(x) + k_{H1}(\lambda)d_{H1}(x) + \ldots + \\ k_{Hm_H}(\lambda)d_{Hm_H}(x) + k_{E0}(\lambda)d_{E0}(x) + \ldots + \\ k_{Em_E}(\lambda)d_{Em_E}(x) + k_{R0}(\lambda)d_{R0}(x) + \ldots + k_{Rm_R}(\lambda)d_{Rm_R}(x)$$ (33)

Subsequently, the display image generating unit 149b converts the spectral transmittance t(x,λ) in each of the pixel positions (x) newly synthesized to an RGB value and combines RGB images, thereby generating a display image (step f9). The process of converting the spectral transmittance t(x, λ) to RGB values is performed by using Equations (7) and (8) described in the first embodiment in a manner similar to the procedure in step a3 in FIG. 2. The RGB images synthesized here are images expressing a state where only the dye to be displayed is stained (only the dye amount of the dye to be displayed is visualized).

Subsequently, the image display processing unit 175b performs a process of displaying a display image generated in step f9 on the display unit 13 (step f11) and, after that, moves to step f23. At this time, the display image generated in step f9 may be displayed in place of the display image already displayed, or displayed in parallel with the display image already displayed.

While displaying the display image, the operation of adjusting the dye amount of the dye to be displayed is accepted. For example, the dye amount adjustment input requesting unit 177b performs a process of displaying a notification of a dye amount adjustment input request on the display unit 13. When the dye amount adjusting operation is entered in response to the notification of the adjustment input request (Yes in step f13), the dye amount adjustment input requesting unit 177b notifies the dye amount correcting unit 150b of the input adjustment amount.

The dye amount correcting unit 150b corrects the dye amount of the dye to be displayed in accordance with the adjustment amount notified from the dye amount adjustment input requesting unit 177b (step f15). After that, the spectrum synthesizing unit 151b newly calculates the spectral transmittance t(x,λ) in accordance with Equation (33) in a manner similar to step f7 on the basis of the dye amount of each of the dye classes of the corrected dyes H, E, and R (step f17). The display image generating unit 149b converts the newly calculated spectral transmittance t(x,λ) in each of the pixel positions to RGB values by using the above Equations (7) and (8) in a manner similar to step f9 and combines the RGB images, thereby generating a display image (step f19).

Subsequently, the image display processing unit 175b performs a process of displaying the display image generated in step f19 on the display unit 13 (step f21) and, after that, moves to step f23. At this time, the display image generated in step f19 may be displayed in place of the display image already displayed, or they may be displayed side by side.

In step f23, whether the image display is finished or not is determined. When the image display is not finished (No in step f23), the program returns to step f3 where the operation of selecting the dye to be displayed is accepted. For example, when a screen display finishing operation is entered by the user, it is determined that the image display is finished (Yes in step f23).

Figure 17:
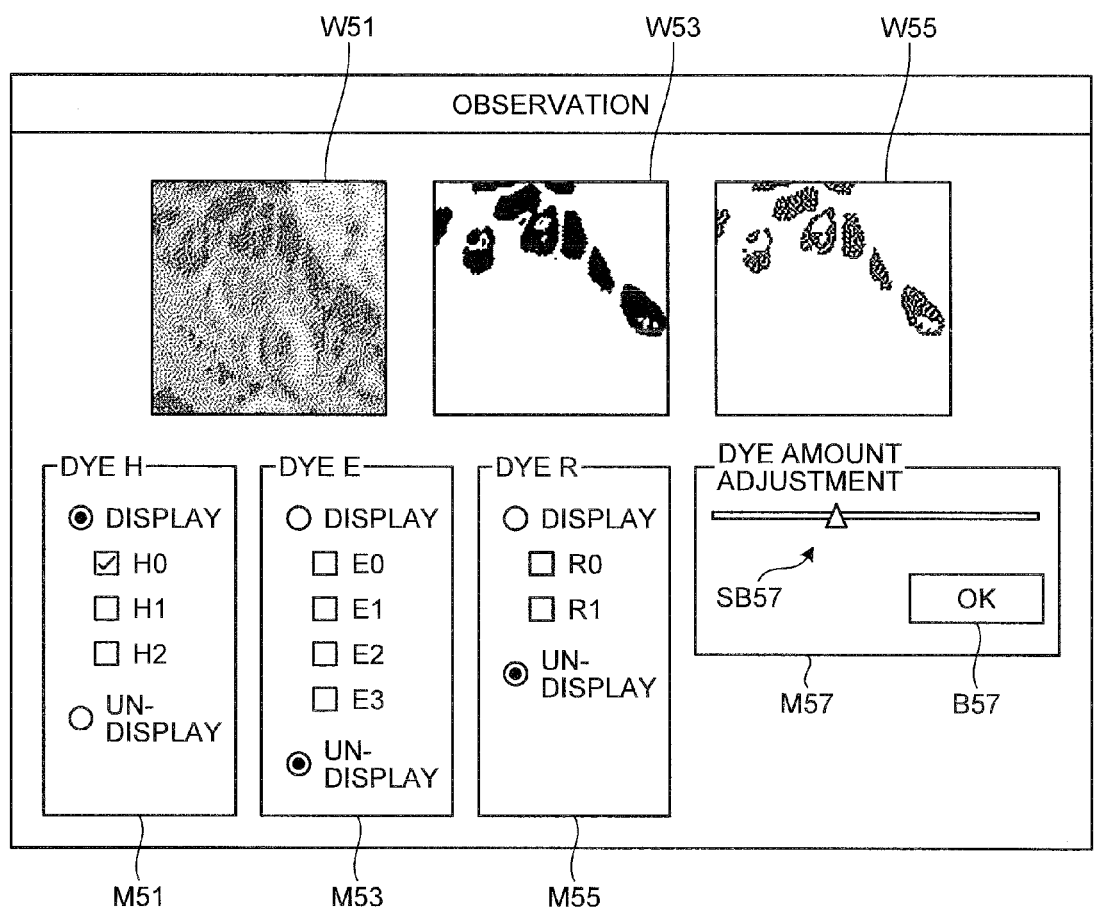
FIG. 17 is a diagram showing an example of an observation screen in the second embodiment.

An operation example when the user observes the display image will now be described. FIG. 17 is a diagram showing an example of the observation screen of the display image in the second embodiment. The observation screen shown in FIG. 17 has three image display parts W51, W53, and W55. The observation screen also has a dye H selection menu M51, a dye E selection menu M53, and a dye R selection menu M55 for selecting a dye to be displayed in a manner similar to the first embodiment, and a dye to be displayed can be selected on the dye class unit basis for each staining dye.

In the image display part W51 on the left side in FIG. 17, for example, an observation stained RGB image is displayed. In each of the image display part W53 in the center and the image display part W55 on the right side, an image stained with a dye to be displayed in which only the amount of the dye to be displayed is shown is displayed. The image stained with the dye to be displayed corresponds to the display image generated by the process in step f9 in FIG. 16. In FIG. 17, an image expressing a stained state of only the dye H0 selected as the dye to be displayed is displayed.

Further, the observation screen has a dye amount adjustment menu M57. A slider bar SB57 for adjusting the amount of the dye to be displayed, an OK button B57 for settling the operation in the slider bar SB57, and the like are disposed. For example, in the case where the user wishes to make the stained state of the dye to be displayed darker or lighter during observation/diagnosis of the image stained with the dye to be displayed in the image display part W53 or W55, the user operates the slider bar SB57 in the dye amount adjustment menu M57 to enter the amount of adjusting the dye amount of the dye to be displayed. The image stained with the dye to be displayed in the image display part W55 on the right side in FIG. 17 is an image displayed by adjusting, with the slider bar SB57, the amount of the dye H0 to be lighter than the image stained with the dye to be displayed in the image display part W53 in the center.

As described above, according the second embodiment, an effect similar to that of the first embodiment is produced, and the amount of the dye to be displayed, which is estimated according to the adjustment operation of the user can be corrected on the dye class unit basis. By synthesizing the spectra in the pixel positions on the basis of the amount of the staining dye after correction and combining the RGB images, a display image can be generated. By correcting the amount of the dyes other than the dye to be displayed to zero, an image obtained by visualizing only the amount of the dye to be displayed can be generated as a display image. Therefore, the stained state with each of the staining dyes may be corrected on the dye class unit basis in accordance with a user operation, and an image of the observation stained sample with improved visibility can be presented to the user. For the user, by selecting a desired staining dye on the dye class unit basis and adjusting the dye amount, or by eliminating a staining dye unnecessary for observation or diagnosis or a dye in a dye class unnecessary for observation/diagnosis, the user can adjust the stained state with each of the staining dyes on the dye class unit basis and can therefore observe with excellent visibility, so that diagnosis precision improves.

Since the case of setting a stained sample subjected to the H&E staining as an object to be observed has been described in each of the embodiments and the stained sample subjected to the H&E staining is an object, the case of estimating the amount of each of the dyes H, E, and R is described. The present invention can be similarly applied also to a sample stained with another staining dye, and the dye amount can be estimated. In addition, a peculiar color of a sample itself can be similarly handled like the dye R in each of the foregoing embodiments.

According to the present invention, a spectral characteristic value in a sample point on a corresponding stained sample is obtained on the basis of the pixel value of each of the pixels constructing a stained-sample image, and a plurality of stepwise dye spectral characteristic values can be obtained with respect to staining dyes with which the stained sample to be obtained is stained. On the basis of the obtained spectral characteristic value, by using the plurality of stepwise dye spectral characteristic values, the amount of a staining dye in a sample point on a stained sample can be estimated. Consequently, since the dye spectral characteristic values of the staining dye used for the dye amount estimation can be segmentalized, even in the case where the dye spectral characteristic value of the staining dye with which the sample to be observed is actually stained fluctuates, the dye amount can be estimated with high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising:
   obtaining a spectral characteristic value at a sample point on a stained sample based on a value of a pixel of a stained sample image obtained by imaging the stained sample, the sample point corresponding to the pixel, the stained sample being stained with at least one staining dye;
   obtaining a plurality of reference spectral characteristic values for a single staining dye included in the at least one staining dye; and
   estimating an amount of the staining dye at the sample point on the stained sample by using the plurality of reference spectral characteristic values and the spectral characteristic value at the sample point on the stained sample.

2. The image processing method according to claim 1, wherein the plurality of reference spectral characteristic values is obtained by:
   obtaining a single stained sample image by imaging a single stained sample;
   obtaining spectral characteristic values for each pixel of the single stained sample image; and
   calculating the plurality of reference spectral characteristic values for a dye of the single stained sample based on the spectral characteristic value for each pixel.

3. The image processing method according to claim 2, wherein the obtaining the plurality of reference spectral characteristic values includes
   obtaining a spectral characteristic value at a sample point on a single stained sample based on a value of a pixel of a single stained sample image obtained by imaging the single stained sample, the sample point corresponding to the pixel, the single stained sample being individually stained with the staining dye;
   setting a predetermined reference region in the single stained sample image;
   calculating a spectrum characteristic of the reference region based on the spectral characteristic value at a sample point on the single stained sample obtained with respect to the pixel as a component of the reference region;
   calculating a characteristic difference between the spectral characteristic value at the sample point on the single stained sample obtained with respect to the pixel and the spectrum characteristic, for each pixel of the single stained sample image;
   classifying the pixels of the single stained sample image into a plurality of dye classes based on the characteristic difference; and
   calculating the plurality of reference spectral characteristic values based on the spectral characteristic value at the sample point in the single stained sample with respect to the pixel belonging to the corresponding dye class on the dye class unit basis.

4. The image processing method according to claim 3, further comprising selecting a predetermined reference region candidate in the single stained sample image,
   wherein the setting the reference region includes extracting pixels in the single stained sample image to set the reference region, the extracted pixels each having a value similar to a value of a pixel of the reference region candidate.

5. The image processing method according to claim 4, wherein the selecting includes:
   requesting an input to designate a seeds region constructed by one or plural pixels in the single stained sample image; and
   determining a degree of similarity with a seeds region designated in response to the request of the input to designate the seeds region every pixel position in the single stained sample image, and
   the selecting includes selecting as the reference region candidate a region of pixels having a predetermined area or larger as an area coupled with another pixel determined to have high degree of similarity, among pixels determined to have high degree of similarity in the determination of the degree of similarity.

6. The image processing method according to claim 5, wherein the determining includes determining the degree of similarity based on at least one of a brightness value in each pixel position in the single stained sample image, a brightness value average, a brightness value variance, a color distribution, and a spectral waveform of the spectral characteristic value at a sample point on the single stained sample obtained with respect to the pixel.

7. The image processing method according to claim 3, wherein the classifying includes classifying the pixels to a first class and at least one second class, the first class being for pixels constructing the reference region, the second class being for pixels whose characteristic difference satisfies a predetermined range condition among pixels other then than the pixels constructing the reference region.

8. The image processing method according to claim 3, wherein the estimating includes estimating the amount of the staining dye at a sample point on the stained sample for each of the dye classes by using the calculated plurality of reference spectral characteristic values for each of the dye classes.

9. An image processing apparatus comprising:
   a spectral characteristic obtaining unit that obtains a first spectral characteristic value at a sample point on a stained sample based on a value of a pixel of a stained sample image obtained by imaging the stained sample, the sample point corresponding to the pixel, the stained sample being stained with at least one staining dye;
   a reference spectral characteristic obtaining unit that obtains a plurality of reference spectral characteristic values for a single staining dye included in the at least one staining dye; and
   a dye amount estimating unit that estimates an amount of the staining dye at the sample point on the stained sample by using the plurality of reference spectral characteristic values and the spectral characteristic value at the sample point on the stained sample.

10. The image processing apparatus according to claim 9, wherein the plurality of reference spectral characteristic values is obtained by:
   obtaining a single stained sample image by imaging a single stained sample;
   obtaining spectral characteristic values for each pixel of the single stained sample image; and
   calculating the plurality of reference spectral characteristic values for a dye of the single stained sample based on the spectral characteristic value for each pixel.

11. The image processing apparatus according to claim 10, wherein the reference spectral characteristic obtaining unit includes
   a single staining spectral characteristic obtaining unit that obtains a spectral characteristic value at a sample point on a single stained sample based on a value of a pixel of a single stained sample image obtained by imaging the single stained sample, the sample point corresponding to the pixel, the single stained sample being individually stained with the staining dye;
   a reference region setting unit that sets a predetermined reference region in the single stained sample image;
   a spectrum characteristic calculating unit that calculates a spectrum characteristic of the reference region based on the spectral characteristic value at a sample point on the single stained sample obtained with respect to the pixel as a component of the reference region;
   a characteristic difference calculating unit that calculates a characteristic difference between the spectral characteristic value at the sample point on the single stained sample obtained with respect to the pixel and the spectrum characteristic, for each pixel of the single stained sample image;
   a classifying unit that classifies the pixels of the single stained sample image into a plurality of dye classes based on the characteristic difference; and
   a reference spectral characteristic calculating unit that calculates the plurality of reference spectral characteristic values based on the spectral characteristic value at the sample point in the single stained sample with respect to the pixel belonging to the corresponding dye class on the dye class unit basis.

12. The image processing apparatus according to claim 11, further comprising a reference region candidate selecting unit that selects a predetermined reference region candidate in the single stained sample image,
   wherein the reference region setting unit extracts pixels in the single stained sample image to set the reference region, the extracted pixels each having a value similar to a value of a pixel of the reference region candidate.

13. The image processing apparatus according to claim 11, wherein the dye amount estimating unit estimates the amount of the staining dye at a sample point on the stained sample for each of the dye classes by using the calculated plurality of reference spectral characteristic values for each of the dye classes.

14. The image processing apparatus according to claim 11, further comprising:
   a dye class selection requesting unit for requesting an input to select a class of a dye to be displayed;
   a display image generating unit that generates a display image in which a pixel position in the stained sample image is shown so as to be discriminated from another pixel position, the stained sample image including a dye amount in the class of the dye to be displayed which is selectively input in response to a request from the dye class selection requesting unit based on an amount of the staining dye estimated for each of the dye classes by the dye amount estimating unit; and
   a display processing unit that displays the display image on a display unit.

15. The image processing apparatus according to claim 11, further comprising:
   a dye amount correcting unit that corrects an amount of the staining dye estimated for each of the dye classes by the dye amount estimating units;
   a spectral characteristic synthesizing unit that synthesizes a spectral characteristic value on the basis of the amount of the staining dye for each of the dye classes after correction by the dye amount correcting unit;
   a display image generating unit that synthesizes RGB images based on the spectral characteristic value synthesized by the spectral characteristic synthesizing unit and generates a display image expressing a stained state of each of the dye classes by the staining dye, by the amount of the staining dye for each of the dye classes after correction; and a display processing unit that displays the display image on a display unit.

16. The image processing apparatus according to claim 15, further comprising a dye class selection requesting unit that requests an input to select a class of a dye to be displayed, wherein the dye amount correcting unit corrects a dye amount on the class of the dye to be displayed which is selectively input in response to a request from the dye class selection requesting unit.

17. The image processing apparatus according to claim 15, further comprising a dye class selection requesting unit that requests an input to select a class of a dye to be displayed, wherein the dye amount correcting unit corrects a dye amount of a dye class to zero, other than the class of the dye to be displayed which is selectively input in response to the request from the dye class selection requesting unit, and the display image generating unit generates the display image by undisplaying dye classes other than the class of the dye to be displayed.

18. A non-transitory computer-readable recording medium storing an image processing program, the image processing program including instructions to cause a computer to execute:

obtaining a spectral characteristic value at a sample point on a stained sample based on a value of a pixel of a stained sample image obtained by imaging the stained sample, the sample point corresponding to the pixel, the stained sample being stained with at least one staining dye;

obtaining a plurality of reference spectral characteristic values for a single staining dye included in the at least one staining dye; and estimating an amount of the staining dye at the sample point on the stained sample by using the plurality of reference spectral characteristic values and the spectral characteristic value at the sample point on the stained sample.

19. The image processing apparatus according to claim 11, wherein the classifying unit classifies the pixels to a first class and at least one second class, the first class being for pixels constructing the reference region, the second class being for pixels whose characteristic difference satisfies a predetermined range condition among pixels other than the pixels constructing the reference region.

\* \* \* \* \*